United States Patent
Fukuma et al.

(10) Patent No.: US 8,341,760 B2
(45) Date of Patent: Dec. 25, 2012

(54) SCANNING PROBE MICROSCOPE

(75) Inventors: Takeshi Fukuma, Ishikawa (JP); Yasumasa Ueda, Hyogo (JP)

(73) Assignees: National University Corporation, Ishikawa (JP); Kanazawa University

( * ) Notice: Subject to any disclaimer, the term of this patent is extended or adjusted under 35 U.S.C. 154(b) by 0 days.

(21) Appl. No.: 13/147,275

(22) PCT Filed: Jan. 14, 2010

(86) PCT No.: PCT/JP2010/000164
§ 371 (c)(1),
(2), (4) Date: Oct. 14, 2011

(87) PCT Pub. No.: WO2010/087114
PCT Pub. Date: Aug. 5, 2010

(65) Prior Publication Data
US 2012/0030845 A1    Feb. 2, 2012

(30) Foreign Application Priority Data

Feb. 2, 2009    (JP) ................................. 2009-021675

(51) Int. Cl.
*G01Q 10/00*    (2010.01)
*G01Q 60/24*    (2010.01)
*G01N 13/16*    (2006.01)

(52) U.S. Cl. .................. 850/1; 850/5; 850/33; 977/850; 977/851

(58) Field of Classification Search .................. 850/1, 5, 850/33; 977/850, 851
See application file for complete search history.

(56) References Cited

U.S. PATENT DOCUMENTS

| | | | |
|---|---|---|---|
| 7,954,165 B2 * | 5/2011 | Ando et al. | 850/4 |
| 2007/0194225 A1 * | 8/2007 | Zorn | 250/306 |
| 2012/0151637 A1 * | 6/2012 | Fukuma et al. | 850/1 |

FOREIGN PATENT DOCUMENTS

| | | |
|---|---|---|
| JP | 05-187864 A | 7/1993 |
| JP | 11-044698 A | 2/1999 |
| JP | 2000-329675 A | 11/2000 |

(Continued)

OTHER PUBLICATIONS

International Search Report for PCT/JP2010/000164; Mar. 23, 2010.

(Continued)

*Primary Examiner* — Nikita Wells
(74) *Attorney, Agent, or Firm* — Pearne & Gordon LLP

(57) ABSTRACT

An atomic force microscope (AFM) (1) is one type of SPM, and detects a resonance frequency shift as an amount of interaction between a probe and a sample. The AFM (1) performs distance modulation control while performing feedback control of a probe-sample distance so as to keep the amount of interaction constant. The distance modulation control varies the probe-sample distance at a distance modulation frequency higher than a response speed of the feedback control. The AFM (1) further acquires the interaction amounts detected during the variation of the probe-sample distance by the distance modulation control while performing relative scanning between the probe and the sample, and detects a distribution of the interaction amounts in a three-dimensional space having a dimension within a scanning range and a thickness within a variation range of the probe-sample distance. The present invention thereby provides a scanning probe microscope (SPM) capable of preferably measuring the distribution of the interactions between the probe and the sample in the three-dimensional space while performing stable probe position control.

13 Claims, 14 Drawing Sheets

Tunneling Current Flowing Between Probe and Sample

FOREIGN PATENT DOCUMENTS

JP  2001-108601 A  4/2001
JP  2005-283538 A  10/2005

OTHER PUBLICATIONS

Kimura, K., et al. "Ekichu dynamic mode Genshi Kanryoku Kenbikyo ni yoru Kyokusho Yobaiwa Kozo Keisoku." IN: Japan Society of Applied Physics and Related Societies; Mar. 27, 2008, vol. 2; p. 692, 29p-Q-12.

Holscher, H., et al. "Measurement of three-dimensional force fields with atomic resolution using dynamic force spectroscopy." IN: Applied Physics Letters, American Institute of Physics, vol. 81, No. 23; Dec. 2, 2002; pp. 4428-4430.

* cited by examiner

Conventional Three-Dimensional Measurement Based on Force Curve Measurement

SCANNING PROBE MICROSCOPE

TECHNICAL FIELD

The present invention relates to a scanning probe microscope, and more particularly, to a technique for enabling measurement of a distribution of interactions between a probe and a sample in a three-dimensional space.

BACKGROUND ART

Scanning probe microscopes (SPMs) detect an interaction (such as a tunneling current or an interaction force) acting between a sharp tip (probe) and a sample by moving the probe close to the sample, and feedback-control a distance between the probe and the sample such that the interaction is kept constant (in the following, the distance between the probe and the sample is referred to as probe-sample distance). SPMs also horizontally scan the probe (or the sample) while maintaining the feedback control. The probe (or the sample) thereby moves up and down so as to follow the contours of the sample. SPMs record a trajectory obtained by the feedback scanning with respect to a horizontal position, so that a contour image of the sample surface can be obtained.

A scanning tunneling microscope (STM) is one of SPM techniques. As shown in FIG. 1, in the STM, the interaction between the probe and the sample is a tunneling current. The STM detects a tunneling current flowing between the probe and the sample by applying a bias voltage between the probe and the sample, and controls the vertical position of the probe such that the tunneling current is kept constant.

FIG. 2 shows the relation between the probe position and the tunneling current. As shown in the drawing, the tunneling current flowing between the probe and the sample monotonically increases in an exponential manner with a decrease in the probe-sample distance. Accordingly, by controlling the vertical position of the probe relative to the sample such that the tunneling current is kept constant, the probe-sample distance can be kept constant.

Next, an atomic force microscope (AFM) will be described. The AFM is also one type of SPMs. The AFM detects an amount of interaction generated by an interaction force acting between the probe and the sample. Examples of the amount of interaction include a displacement amount of a cantilever, an amount of oscillation amplitude variation, an amount of phase variation, an amount of oscillation frequency variation or the like. The AFM feedback-controls the vertical position of the probe relative to the sample such that the detected amount of interaction is kept constant. The AFM employs a cantilever having a sharp tip (probe) at its end as a force detector.

FIG. 3 shows the relation between the probe position and the interaction force in the AFM. The relation is called force curve. FIG. 3 shows a typical example of the force curve measured in atmosphere and in vacuum.

As shown in FIG. 3, in atmosphere and in vacuum, when the probe is moved close to the sample, an attractive interaction force is normally applied first due to a van der Waals force and an electrostatic force. When the probe is moved closer to the sample, a strong repulsive force is applied due to a chemical interaction force, and the repulsive force exceeds the attractive force. Thus, the interaction force does not monotonically vary with the probe-sample distance.

When the STM and the AFM are compared, the tunneling current monotonically varies with the probe-sample distance in the STM as shown in FIG. 2. Meanwhile, in the AFM, the interaction force does not monotonically vary with the probe-sample distance as shown in FIG. 3. Thus, the amount of interaction generated by the interaction force does not also monotonically vary with the probe-sample distance, and it is difficult to stably feedback-control the probe position within an entire distance range. For example, in a distance region where the attractive interaction is dominant, the probe-sample distance is controlled on the assumption that the attractive force becomes stronger as the probe approaches the sample. The probe may be moved so much close to the sample under such control, as to enter a region where the repulsive force is dominant. In this case, the interaction force indicates an opposite response to a distance variation. The feedback control thereby becomes unstable, and the probe strongly collides with the sample.

Thus, in normal AFM observation, a feedback target point is selected from a distance region where the amount of interaction monotonically varies with the probe-sample distance for the sake of stable control. This means that only position information of a plane with an equal interaction amount where the amount of interaction has a given value is obtained, and information of a position where the amount of interaction has another value cannot be obtained. That is, information of positions other than the feedback target point cannot be obtained. For example, information of the lowest point and its proximity of the force curve in FIG. 3 cannot be obtained. Accordingly, in the conventional general AFM observation, information of the interaction force in a three-dimensional space cannot be obtained.

FIG. 3 shows the example in atmosphere and in vacuum. However, the above problem becomes more serious in AFM observation in liquid. In a solid-liquid interface, solvent molecules often form a layered structure. The interface thereby spreads not only horizontally but also vertically to the sample. In the conventional AFM technique, however, only the position information of the plane with an equal interaction amount where the amount of interaction has a given value can be obtained. Thus, the structure and physicality of the interface (more specifically, an interface space including the interface and its proximity) cannot be fully understood.

In the observation in liquid, the probe position is also sometimes not easy to control. FIG. 4 shows an example of a force curve in an interface where a layered structure of a hydrated layer or the like is formed. FIG. 4 shows the dependence of the interaction force on the probe-sample distance as a measurement result in phosphate buffered saline. As shown in FIG. 4, a repulsive force is generated when the probe penetrates the hydrated layer. After the probe penetrates the hydrated layer, an attractive force is generated. Due to the repulsive force and the attractive force, the force curve indicates a vibrating profile. Therefore, there are a plurality of probe positions usable in the feedback with respect to one interaction force. To stably perform the feedback control, one of the plurality of probe positions need to be selected with good controllability. However, such control is not easy to perform, and the controllability of the probe position is substantially lowered.

As described above, the normal AFM observation technique has a problem with the probe position control, and a problem that information of an interface that spreads three-dimensionally cannot be fully understood. To solve the problems, a three-dimensional space measurement technique based on force curve measurement has been conventionally proposed as described below.

By referring to FIG. 5, the conventionally-proposed three-dimensional measurement technique measures a distribution of interaction forces in a three-dimensional space by acquiring force curves at a plurality of measurement points arranged in an array on an XY plane. For example, as shown on the left side of FIG. 5, the force curves are measured while the X position is moved little by little with respect to the same Y position. By the operation, an XY image that reflects the distribution of interaction forces of an XZ plane can be provided. The similar operation is also performed while the Y position is shifted little by little. Accordingly, the XYZ three-dimensional distribution of interaction forces can be measured.

However, the conventional technique described above has a problem that it takes much time since the two operations (the operation to acquire the force curve at each point, and the operation to move the XY positions of the probe) need to be intermittently combined together.

There is also a problem that a great impulsive force is generated at a moment in which the probe is moved closest to the sample and at a moment in which the probe is moved farthest from the sample, to thereby induce oscillation in various machine parts.

To acquire the force curve, the probe is moved closer to the sample by a given distance from a given Z position regardless of the surface contours. Depending on the contours of the probe or the angle of the sample, the probe may strongly collide with the sample to cause great damage thereto.

To avoid the collision as described above, the probe may be moved away from the sample at a moment in which the interaction force exceeds a given value. However, to incorporate such control as to move the probe away from the sample, the interaction force needs to be monitored continuously during movement of the probe. Such monitoring control during measurement is more complicated than the normal simple force curve measurement where data is processed after the completion of measurement. Measurement time thereby increases, and as a result, a sample drift during measurement has a more influence. The above control to move away the probe also causes a problem that a great impulsive force is generated at a moment in which the probe moving direction is rapidly changed.

To avoid the problems as described above, the conventional three-dimensional measurement technique in FIG. 5 is applied within a correspondingly limited range. Actually, the conventional three-dimensional measurement technique has been employed only in AFM observation under an extremely-low temperature environment in ultrahigh vacuum where the influence of drift can be ignored even when it takes very long time to measure the force curve. Accordingly, it is very difficult to use the conventional three-dimensional measurement technique in atmosphere and in-liquid environments. It is also very difficult to use the technique in a room-temperature environment.

The aforementioned conventional three-dimensional measurement technique using the force curve is disclosed in Non Patent Literature 1, for example.

The background art of the present invention has been described above based on the AFM. However, similar demands may also arise in other types of SPMs.

CITATION LIST

Non Patent Literature

Non Patent Literature 1: H. Holscher et al. Measurement of three-dimensional force fields with atomic resolution using dynamic force spectroscopy, APPLIED PHYSICS LETTERS, 2002 American Institute of Physics, 2 Dec. 2002, Volume 81, Number 23, pp. 4428-4430

SUMMARY OF INVENTION

Technical Problem

The present invention has been made under the aforementioned circumstances. It is an object of the present invention to provide a technique capable of preferably measuring a distribution of interactions between a probe and a sample in a three-dimensional space while performing stable probe position control.

Solution to Problem

According to one aspect of the present invention, a scanning probe microscope includes: a probe; a scanner which performs relative scanning between the probe and a sample; a displacement sensor which detects a displacement of the probe; an interaction detecting section which detects an amount of interaction generated by an interaction between the probe and the sample and representing magnitude of the interaction based on a signal detected by the displacement sensor; a feedback control section which performs feedback control of a probe-sample distance as a distance between the probe and the sample such that the amount of interaction detected by the interaction detecting section is kept constant; a distance modulation control section which performs distance modulation control to vary the probe-sample distance at a distance modulation frequency higher than a response speed of the feedback control; and a three-dimensional distribution detecting section which detects a distribution of the interaction amounts in a three-dimensional space having a dimension within a scanning range and a thickness within a variation range of the probe-sample distance from the interaction amounts detected during the variation of the probe-sample distance by the distance modulation control while performing the relative scanning between the probe and the sample.

According to another aspect of the present invention, an observation method for a scanning probe microscope includes the steps of: performing relative scanning between a probe and a sample by moving the probe and the sample close to each other; detecting a displacement of the probe; detecting an amount of interaction generated by an interaction between the probe and the sample and representing magnitude of the interaction based on a detected signal; performing feedback control of a probe-sample distance as a distance between the probe and the sample such that the amount of interaction is kept constant; performing distance modulation control to vary the probe-sample distance at a distance modulation frequency higher than a response speed of the feedback control; and detecting a distribution of the interaction amounts in a three-dimensional space having a dimension within a scanning range and a thickness within a variation range of the probe-sample distance from the interaction amounts detected during the variation of the probe-sample distance by the distance modulation control while performing the relative scanning between the probe and the sample.

According to another aspect of the present invention, an observation program for a scanning probe microscope causes a computer to execute: a process of performing relative scanning between a probe and a sample by moving the probe and the sample close to each other; a process of detecting a displacement of the probe; a process of detecting an amount of interaction generated by an interaction between the probe and the sample and representing magnitude of the interaction based on a detected signal; a process of performing feedback control of a probe-sample distance as a distance between the probe and the sample such that the amount of interaction is kept constant; a process of performing distance modulation control to vary the probe-sample distance at a distance modulation frequency higher than a response speed of the feedback control; and a process of detecting a distribution of the interaction amounts in a three-dimensional space having a dimension within a scanning range and a thickness within a variation range of the probe-sample distance from the interaction amounts detected during the variation of the probe-sample distance by the distance modulation control while performing the relative scanning between the probe and the sample.

As described below, there are other aspects in the present invention. The disclosure of the invention is intended to provide some of the aspects of the present invention, and is in no way intended to limit the scope of the invention described and claimed herein.

DESCRIPTION OF EMBODIMENTS

Figure 1:
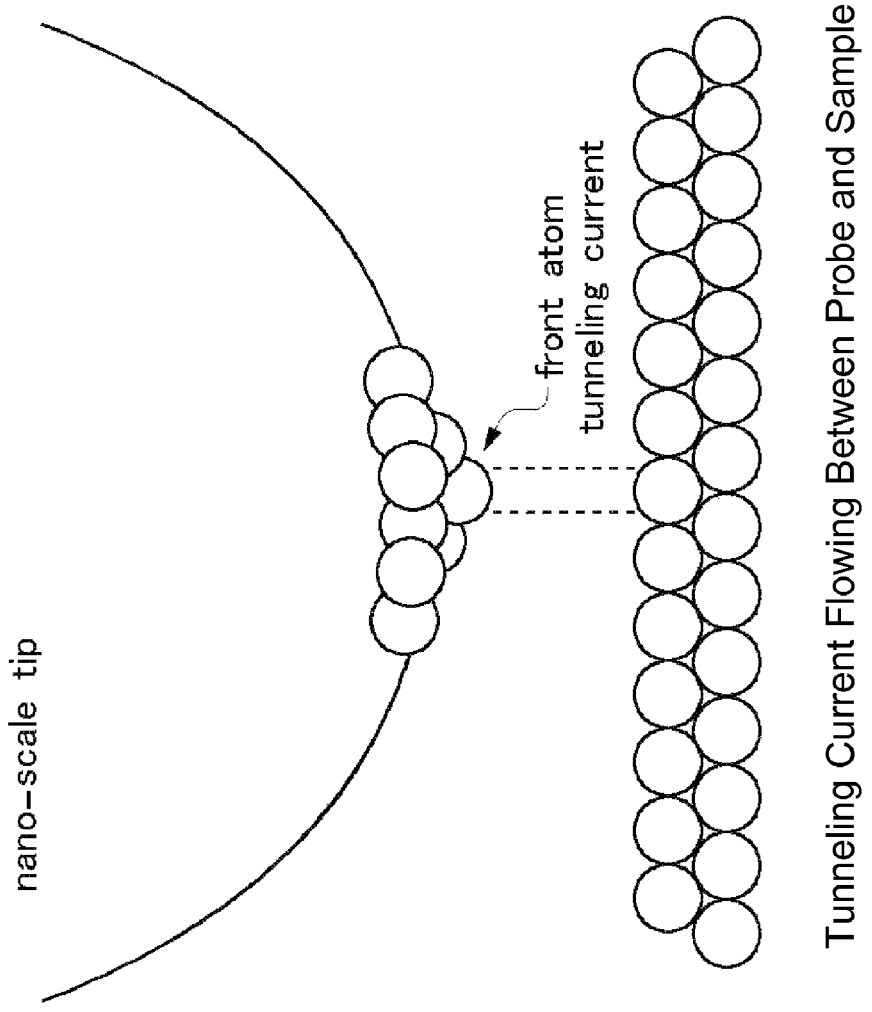
FIG. 1 is a view illustrating the principle of a scanning tunneling microscope (STM).

In the following, the present invention will be described in detail. Please note that the following detailed description and the accompanying drawings do not limit the invention. Instead, the scope of the invention is defined by the appended claims.

A scanning probe microscope according to the present invention includes: a probe; a scanner which performs relative scanning between the probe and a sample; a displacement sensor which detects a displacement of the probe; an interaction detecting section which detects an amount of interaction generated by an interaction between the probe and the sample and representing magnitude of the interaction based on a signal detected by the displacement sensor; a feedback control section which performs feedback control of a probe-sample distance as a distance between the probe and the sample such that the amount of interaction detected by the interaction detecting section is kept constant; a distance modulation control section which performs distance modulation control to vary the probe-sample distance at a distance modulation frequency higher than a response speed of the feedback control; and a three-dimensional distribution detecting section which detects a distribution of the interaction amounts in a three-dimensional space having a dimension within a scanning range and a thickness within a variation range of the probe-sample distance from the interaction amounts detected during the variation of the probe-sample distance by the distance modulation control while performing the relative scanning between the probe and the sample.

As described above, according to the present invention, the distance modulation control is performed while the feedback control is being performed. The distance modulation control is control to vary the probe-sample distance at the distance modulation frequency higher than the response speed of the feedback control. With the present invention, stable position control is ensured by the feedback control. By further performing the distance modulation control, the distribution of the interaction amounts in the three-dimensional space can be detected as described above. Accordingly, the distribution of the interactions between the probe and the sample in the three-dimensional space can be preferably measured while the stable probe position control is being performed.

In the present invention, the probe position control means control of the relative positions of the probe and the sample. Thus, the probe position control may be achieved by moving the probe, by moving the sample, or by moving the both.

The distance modulation control section may vary the probe-sample distance in a sinusoidal pattern along a time axis.

The feedback control section may generate a drive signal for driving the scanner. The distance modulation control section may generate a distance modulation signal having the distance modulation frequency. The distance modulation signal may be added to the drive signal.

The three-dimensional distribution detecting section may separately acquire the distribution of the interaction amounts during the probe approach to the sample by the distance modulation control, and the distribution of the interaction amounts during the probe retraction from the sample by the distance modulation control.

The scanning probe microscope may be an atomic force microscope, including a cantilever with the probe.

The atomic force microscope may be a frequency modulation atomic force microscope. The interaction detecting section may detect a resonance frequency shift of the cantilever as the amount of interaction.

The scanning probe microscope according to the present invention may further include: a drift monitoring section which monitors the amount of interaction detected at a predetermined drift monitoring position, which is defined within the variation range of the probe-sample distance by the distance modulation control and at which the probe-sample distance increases, as an indication of a drift of the amount of interaction; and a drift canceling section which cancels the drift of the amount of interaction based on the amount of interaction monitored at the drift monitoring position by the drift monitoring section.

The scanning probe microscope according to the present invention may further include a distribution data processing section which processes data of the distribution of the interaction amounts in the three-dimensional space obtained by the three-dimensional distribution detecting section. The distribution data processing section may obtain the distribution of the interaction amounts on a plane where the probe-sample distance is constant. The distribution data processing section may obtain a plurality of representative values of the interaction amounts respectively on a plurality of planes where the probe-sample distances differ from each other, to thereby obtain a variation in the representative values during the probe approach the sample. The distribution data processing section may obtain the distribution of the interaction amounts on a cut plane obtained by cutting the three-dimensional space along a plane intersecting with a surface of the sample. The distribution data processing section may obtain a variation in the interaction amounts along a line intersecting with a surface of the sample at a plurality of different positions on the sample.

According to another aspect of the present invention, an observation method for a scanning probe microscope includes the steps of: performing relative scanning between a probe and a sample by moving the probe and the sample close to each other; detecting a displacement of the probe; detecting an amount of interaction generated by an interaction between the probe and the sample and representing magnitude of the interaction based on a detected signal; performing feedback control of a probe-sample distance as a distance between the probe and the sample such that the amount of interaction is kept constant; performing distance modulation control to vary the probe-sample distance at a distance modulation frequency higher than a response speed of the feedback control; and detecting a distribution of the interaction amounts in a three-dimensional space having a dimension within a scanning range and a thickness within a variation range of the probe-sample distance from the interaction amounts detected during the variation of the probe-sample distance by the distance modulation control while performing the relative scanning between the probe and the sample. The aforementioned various configurations may be also applied to the aspect.

As described above, according to the present invention, the distance modulation control is performed while the feedback control is being performed. Accordingly, the distribution of the interactions between the probe and the sample in the three-dimensional space can be preferably measured while the stable probe position control is being performed.

In the following, embodiments of the present invention will be described by using the drawings. In a present embodiment, the present invention is applied to an atomic force microscope (AFM). However, the present invention is not limited to the AFM. The present invention may be applied to a scanning probe microscope (SPM) other than the AFM. The present invention may be applied to a scanning tunneling microscope (STM), for example. The present invention may be also applied to a near-field optical microscope (SNOM), for example. The present invention may be also achieved by a program stored in a memory or an HDD (not shown) of the SPM (for example, the AFM).

Figure 5:
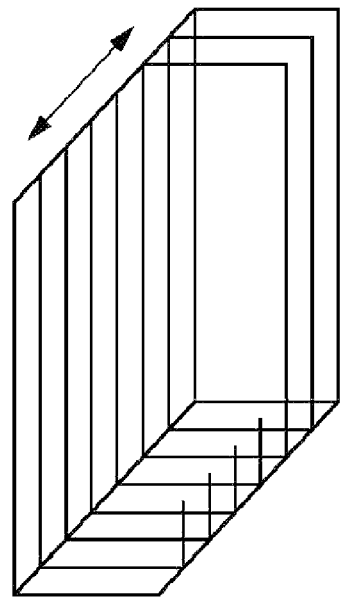
FIG. 5 is a view illustrating a measurement technique using force curve measurement, as a three-dimensional measurement technique for an interaction force in a conventional technique.
Figure 5:
Figure 5:
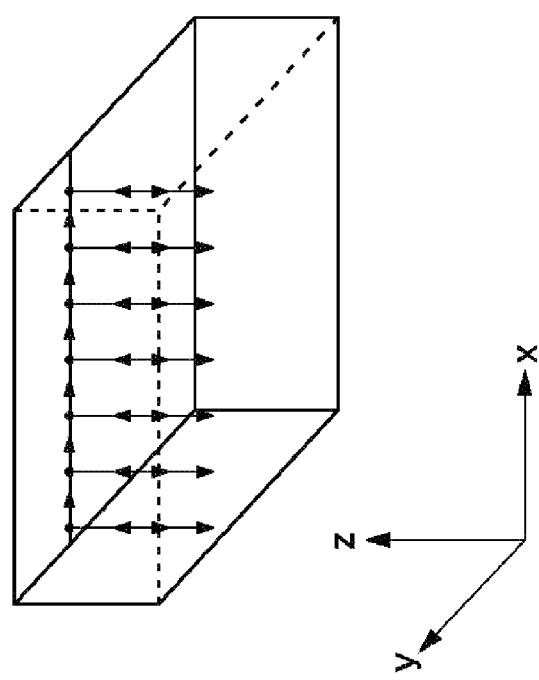
Figure 6:
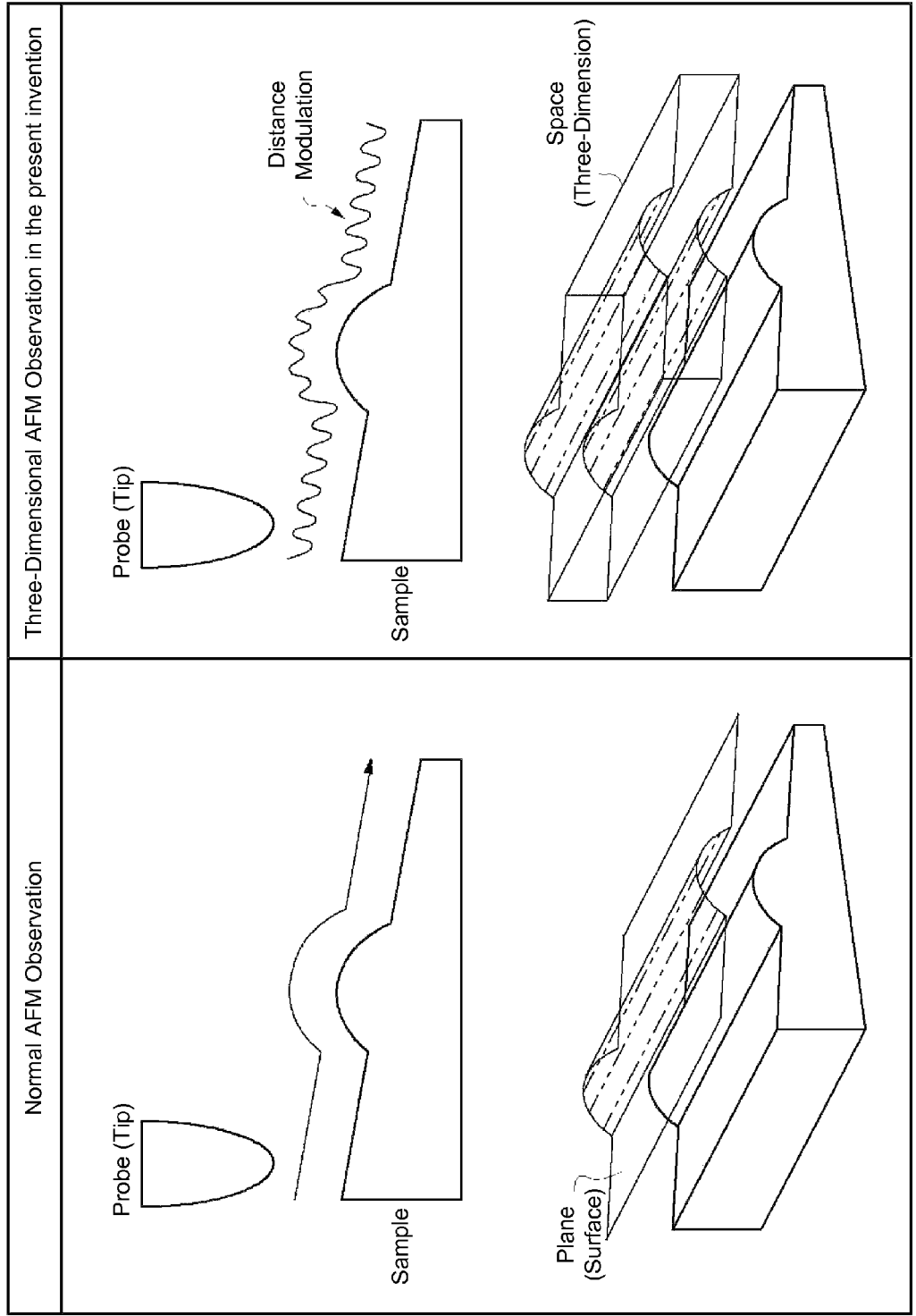
FIG. 6 is a view illustrating the principle of a three-dimensional measurement technique for an interaction force according to the present invention.

FIG. 6 shows the principle of a three-dimensional measurement technique for an interaction force according to the present invention. The above conventional technique in FIG. 5 is a technique based on force curve measurement. The conventional technique obtains a three-dimensional distribution of interaction forces by repeating the force curve measurement while moving a measurement point. Unlike in the conventional technique, the present invention in FIG. 6 applies the conventional AFM observation technique to a three-dimensional measurement technique. In FIG. 6, conventional AFM observation is shown on the left side, and AFM observation according to the present invention is shown on the right side.

In the conventional AFM observation, the position of a probe is feedback-controlled such that an interaction force between a probe and a sample is kept constant (The control of the probe position means control of the relative positions of the probe and the sample. In an actual AFM, the probe position may be controlled by moving the sample. The same applies to the present description). A probe-sample distance is kept constant by the control. As a result, the probe is scanned on a "plane" apart from the sample by a given distance.

In the AFM observation according to the present invention, feedback control similar to that of the conventional technique is performed. A difference from the conventional technique is that such control as to vary a probe-sample distance is performed while the feedback control is being performed in the present invention. The control is called distance modulation control in the present invention. A frequency used for distance modulation is called distance modulation frequency. The distance modulation frequency is set to be substantially higher than a response speed of the feedback control. More specifically, the distance modulation frequency has an appropriate value between the response speed of the feedback control and a resonance frequency of a cantilever. For example, when the resonance frequency of the cantilever is 1 kHz or more, the distance modulation frequency is set to about 200 Hz. The distance modulation amplitude is preferably set to a very small value (normally, 1 nm or less). Moreover, in the distance modulation control, the probe-sample distance is preferably varied in a sinusoidal pattern.

In the present invention, by performing the feedback control and the distance modulation control described above, a probe can be scanned in a "space" having a thickness in a Z direction (the vertical direction) as shown on the right side of FIG. 6. Accordingly, a distribution of interaction amounts in the three-dimensional space can be detected.

Here, in FIG. 6, the conventional AFM observation obtains information of the plane having a given distance from the sample, and may thus be called two-dimensional observation. Meanwhile, the AFM control according to the present invention obtains information in the three-dimensional space having the thickness in the Z direction, and may thus be called three-dimensional observation or three-dimensional measurement.

Next, a preferable example of the AFM to which the present invention is applied will be described. Here, the present invention is applied to a frequency modulation AFM (FM-AFM). Please note that the present invention is not limited to the FM-AFM, and may be also applied to an AFM other than the FM-AFM. Furthermore, the present invention may be also applied to an SPM other than the AFM as described above.

Figure 7:
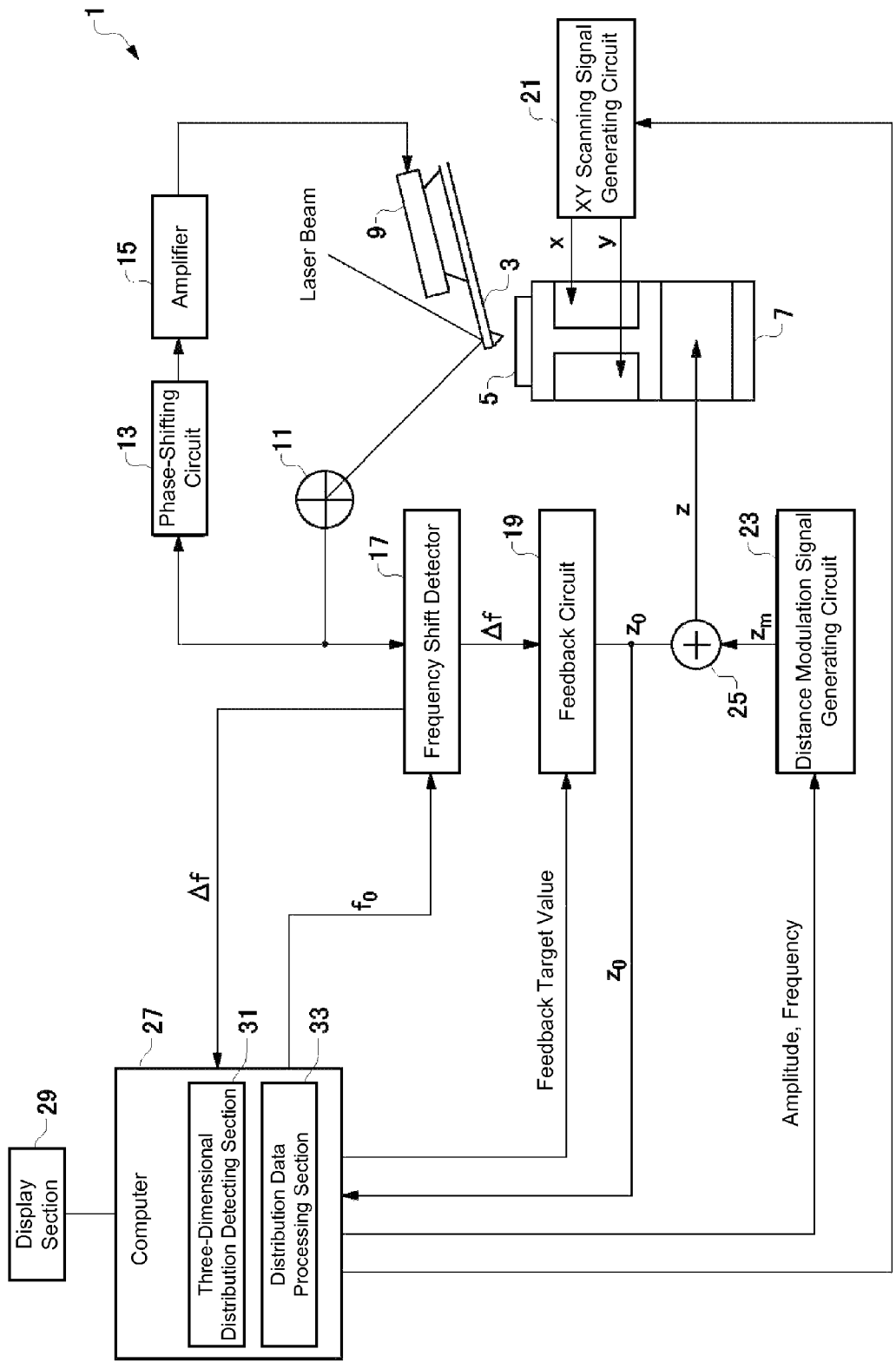
FIG. 7 is a view illustrating the configuration of an AFM according to an embodiment of the present invention.

FIG. 7 shows an AFM according to the present embodiment. In the FM-AFM, the amount of interaction is a resonance frequency shift $\Delta f$ (an amount of resonance frequency shift) of a cantilever.

Generally, an AFM 1 mechanically oscillates a cantilever 3 at a resonance frequency, detects the resonance frequency shift Δf generated when the cantilever 3 is moved close to a sample, and feedback-controls a probe-sample distance such that the resonance frequency shift Δf is kept constant.

In the feedback control, a scanning signal z0 for Z scanning that controls the probe-sample distance is generated, which is similar to that in the conventional AFM observation technique. A main difference from the conventional technique is that the AFM 1 according to the present embodiment generates a distance modulation signal zm having a frequency substantially higher than a response speed of the feedback control. The distance modulation signal zm is a fixed sinusoidal signal. The distance modulation signal zm is added to the scanning signal z0, to thereby generate a modulation scanning signal z. The modulation scanning signal z controls the probe-sample distance. By adding the distance modulation signal zm, the Z position of the probe is modulated at high speed.

As described above, in the present invention, the distance modulation signal zm for finely varying the probe position in the Z direction along a sinusoidal wave having constant amplitude is added to the scanning signal z0 of the feedback control for adjusting the probe position according to the contours of the sample surface. The probe finely moves up and down while moving along the contours of the sample. As a result, movement of the probe in the present invention shown in FIG. 6 is achieved. In the following, the AFM 1 in FIG. 7 will be described in more detail.

As shown in FIG. 7, the AFM 1 includes the cantilever 3 arranged adjacent to the sample, and a sample stage 5 for holding the sample. In a similar manner to a normal FM-AFM, the AFM 1 also includes a scanner 7, a lever actuator 9, a displacement sensor 11, a phase-shifting circuit 13, an amplifier 15, a frequency shift detector 17, a feedback circuit 19, and an XY scanning signal generating circuit 21. The AFM 1 further includes a distance modulation signal generating circuit 23 and a signal adding section 25 as a characteristic configuration of the present invention. The AFM 1 also includes a computer 27 for controlling the entire AFM, and a display section 29. A program that achieves the present invention may be installed on the computer 27.

The sample stage 5 is mounted to the scanner 7. The scanner 7 is a piezoelectric scanner having a piezoelectric element as an actuator. The scanner 7 moves the sample stage 5 in X, Y and Z directions, to scan the sample relative to the cantilever 3. The XY directions are directions perpendicular to each other on a horizontal plane. The Z direction is the vertical direction, which is the direction of contours (the height direction) of the sample. The cantilever 3 is made of silicon, and has a tip (probe) at a free end. The cantilever 3 is excited by the lever actuator 9. A piezoelectric element constitutes the lever actuator 9, which functions as an exciting section. Please note that the scanner 7 and the exciting section 9 are not limited to the piezoelectric actuator. For example, a configuration using magnetism or light may be also applied to effect scanning and excitation.

The displacement sensor 11 detects a displacement of the cantilever 3. Typically, the displacement sensor 11 functions as an optical lever displacement sensor together with a laser unit. The laser unit emits a laser beam, which is reflected at the cantilever 3 to reach the displacement sensor 11. The displacement sensor 11 is a split diode sensor formed of photo diodes, and outputs a displacement signal indicating the displacement of the cantilever 3. A light receiving position of the laser beam is preferably detected as the displacement signal. The displacement signal is input into the phase-shifting circuit 13 and the frequency shift detector 17. In the drawing, the configuration of an optical system such as a lens in relation to the sensor is not shown.

The phase-shifting circuit 13 processes the displacement signal from the displacement sensor 11, and generates an excitation signal to oscillate the cantilever 3 at the resonance frequency. When the cantilever 3 is oscillated at the resonance frequency, a phase difference between the excitation signal and the displacement signal is 90 degrees. Thus, the phase-shifting circuit 13 generates the excitation signal such that the phase difference between the excitation signal and the displacement signal becomes 90 degrees. The amplifier 15 amplifies and feeds the excitation signal to the lever actuator 9. The lever actuator 9 thereby oscillates the cantilever 3 at the resonance frequency.

The frequency shift detector 17 processes the displacement signal from the displacement sensor 11, and detects the resonance frequency shift Δf. A phase lock loop (PLL) circuit may constitute the frequency shift detector 17. The frequency shift detector 17 and the phase-shifting circuit 13 may be a digital circuit such as a digital signal processor (DSP).

The frequency shift detector 17 is one example of the interaction detecting section in the present invention. The resonance frequency shift Δf is a parameter generated by an interaction force between the probe and the sample and representing the magnitude of the interaction force, and is one example of the amount of interaction in the present invention.

The frequency shift detector 17 feeds the resonance frequency shift Δf to the feedback circuit 19. The feedback circuit 19 generates the scanning signal z0 for keeping the resonance frequency shift Δf constant based on the resonance frequency shift Δf. A PID circuit may constitute the feedback circuit 19, for example. The feedback circuit 19 corresponds to the feedback control section in the present invention.

The XY scanning signal generating circuit 21 generates scanning signals x and y for scanning the cantilever 3 in the XY directions relative to the sample. The XY scanning signal generating circuit 21 feeds the scanning signals x and y to the scanner 7. The scanner 7 thereby moves the sample stage 5 in the XY directions.

The distance modulation signal generating circuit 23 generates the distance modulation signal zm. The distance modulation signal zm is the sinusoidal signal having the frequency substantially higher than the response speed of the feedback circuit 19. The distance modulation frequency is about 200 Hz, for example, which is much smaller than the resonance frequency of the cantilever 3. The amplitude of the distance modulation signal zm is very small, and 1 nm or less, for example. A waveform generating circuit may constitute the distance modulation signal generating circuit 23. The distance modulation signal generating circuit 23 corresponds to the distance modulation control section in the present invention.

The distance modulation signal generating circuit 23 outputs the distance modulation signal zm to the signal adding section 25. The scanning signal z0 is also input into the signal adding section 25 from the feedback circuit 19. The signal adding section 25 adds the scanning signal z0 and the distance modulation signal zm, to thereby generate the modulation scanning signal z. The modulation scanning signal z is fed to the scanner 7. The scanner 7 moves the sample stage 5 in the Z direction according to the modulation scanning signal z.

The computer 27 controls the entire AFM 1. The computer 27 may be a personal computer, for example. An AFM control board may be mounted on the computer 27.

The computer 27 controls the XY scanning signal generating circuit 21 to perform the scanning in the XY directions.

The computer 27 also feeds a target value of the feedback control to the feedback circuit 19. The computer 27 also controls the distance modulation signal generating circuit 23 to generate the distance modulation signal zm by instructing the frequency and the amplitude. The computer 27 also feeds a center frequency f0 to the frequency shift detector 17. The center frequency f0 corresponds to a resonance frequency of free oscillation of the cantilever 3, that is, a resonance frequency when the cantilever 3 is located far from the sample. The center frequency f0 is used as a reference value in the detection process of the resonance frequency shift Δf.

Also, the feedback circuit 19 inputs the scanning signal z0 into the computer 27. The computer 27 processes the scanning signal z0, to generate data of the contour shape of the sample.

The frequency shift detector 17 also inputs the resonance frequency shift Δf into the computer 27. In the computer 27, a three-dimensional distribution detecting section 31 processes the input data of the resonance frequency shift Δf, to thereby detect a distribution of resonance frequency shifts in a three-dimensional space. The three-dimensional distribution detecting section 31 may be called three-dimensional distribution measuring section, or simply three-dimensional measuring section.

A distribution data processing section 33 is also provided in the computer 27. The distribution data processing section 33 processes the data of the distribution of resonance frequency shifts in the three-dimensional space obtained by the three-dimensional distribution detecting section 31, and provides useful information as described below.

The computer 27 outputs information of various measurement results obtained as described above to the display section 29. The computer 27 also provides a user interface function. Various instructions from a user are input into the computer 27. The computer 27 controls the AFM 1 according to the input from a user.

Next, the entire operation of the AFM 1 will be described. The XY scanning signal generating circuit 21 is controlled by the computer 27 to cause the scanner 7 to perform the scanning in the XY directions. During the scanning in the XY directions, the displacement sensor 11 detects the displacement of the cantilever 3, and outputs the displacement signal to the phase-shifting circuit 13 and the frequency shift detector 17. The phase-shifting circuit 13 processes the displacement signal to generate the excitation signal, and feeds the excitation signal to the lever actuator 9 via the amplifier 15. The cantilever 3 is thereby oscillated at the resonance frequency.

The frequency shift detector 17 also processes the displacement signal from the displacement sensor 11 to detect the resonance frequency shift Δf, and feeds the resonance frequency shift Δf to the feedback circuit 19. The feedback circuit 19 generates the scanning signal z0 for driving the scanner 7 in the Z direction so as to keep the resonance frequency shift Δf constant. The feedback circuit 19 is operated so as to match the resonance frequency shift Δf with the feedback target value fed from the computer 27.

Meanwhile, the distance modulation signal generating circuit 23 generates the distance modulation signal zm under control of the computer 27. The signal adding section 25 adds the scanning signal z0 and the distance modulation signal zm, to thereby generate the modulation scanning signal z, and outputs the signal to the scanner 7. The scanner 7 drives the sample stage 5 in the Z direction according to the modulation scanning signal z.

The scanning in the XY directions is performed while the scanning in the Z direction is being performed based on the modulation scanning signal z as described above. That is, the scanning in the XY directions is performed while the feedback control and the distance modulation control are being performed.

The feedback circuit 19 feeds the scanning signal z0 to the computer 27 in a similar manner to the normal FM-AFM. The scanning signal z0 corresponds to the height in the Z direction of the sample. The position in the XY directions on the sample is also controlled by the computer 27. The computer 27 generates an image of the sample surface based on the control data of the XY scanning and the input scanning signal z0, and displays the image on the display section 29.

The frequency shift detector 17 also feeds the data of the resonance frequency shift Δf to the computer 27. As described above, in the present embodiment, the probe-sample distance is varied according to the distance modulation signal zm during the process of the feedback control. The three-dimensional distribution detecting section 31 accumulates and records the resonance frequency shifts Δf sequentially obtained in the distance variation process. By accumulating and recording the resonance frequency shifts Δf within a distance variation range in the Z direction while performing the scanning in the XY directions, the distribution of the resonance frequency shifts Δf in the three-dimensional space can be obtained. The distribution data processing section 33 processes the data of the distribution of the resonance frequency shifts in the three-dimensional space obtained by the three-dimensional distribution detecting section 31. The display section 29 is a displace device, which displays the data of the three-dimensional distribution and data generated by the distribution data processing section 33.

The operation of the AFM 1 according to the present embodiment has been generally described above. Next, the AFM 1 according to the present embodiment will be described in more detail.

Figure 8:
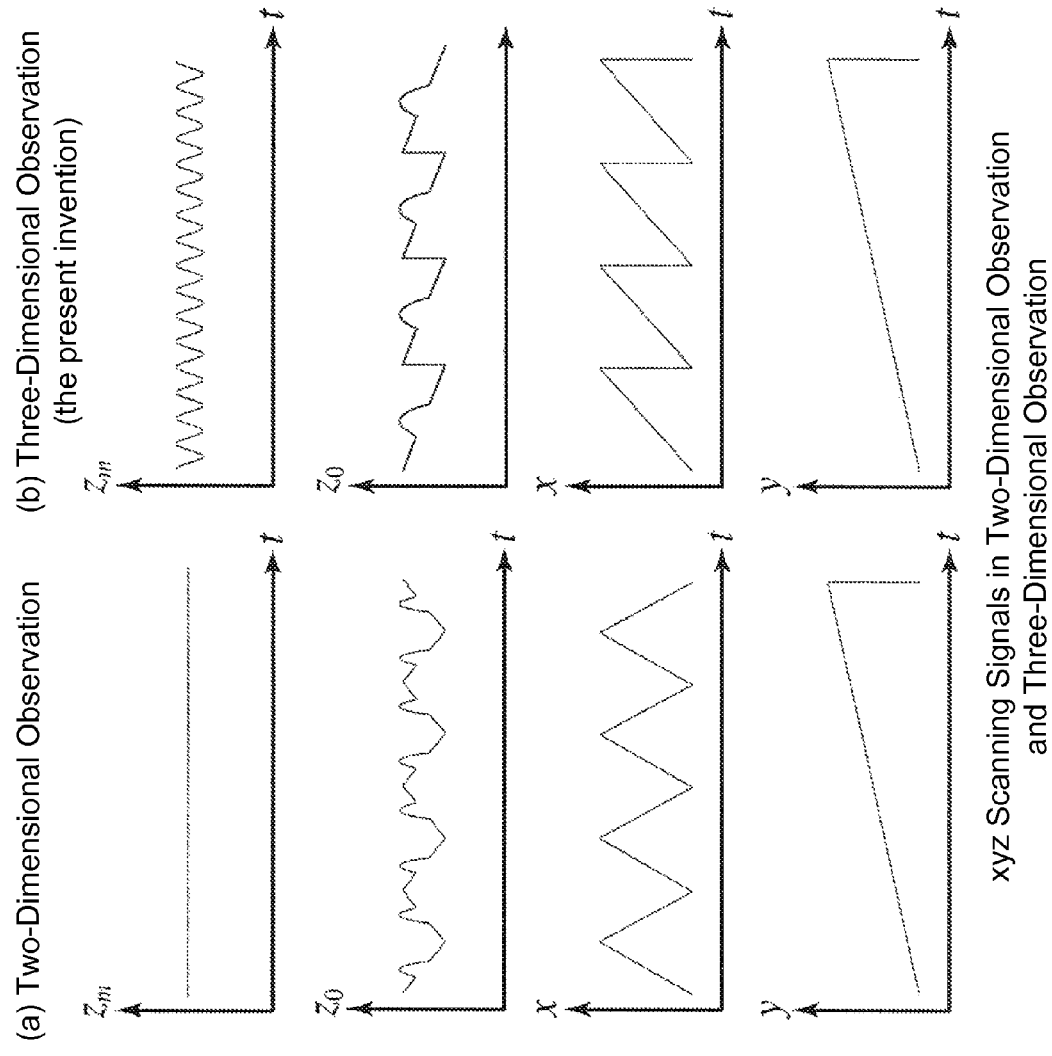
FIG. 8 is a view illustrating variations in xyz scanning signals in conventional normal AFM observation and three-dimensional AFM observation (three-dimensional measurement) according to the present invention.

FIG. 8 schematically shows variations in the xyz scanning signals in the conventional normal AFM observation (the left side) and the three-dimensional AFM observation according to the present invention (the right side). In the conventional normal AFM observation, a triangle wave is input as the scanning signal x of the X direction. The scanning signal y is a ramp signal for moving the position in the Y direction little by little. During the XY scanning, the scanning signal z0 is varied according to the surface contours. The scanning signal z0 is recorded with respect to xy coordinates, so that the surface contour image can be obtained.

Meanwhile, in the three-dimensional observation according to the present invention (on the right side in FIG. 8), the distance modulation signal zm is input, and the probe is always scanned in a sinusoidal pattern in the Z direction. The average position of the Z scanning is controlled by the scanning single z0 as a feedback signal. By the control in the Z direction, the resonance frequency shift Δf is detected within an amplitude range of the distance modulation signal zm. That is, the resonance frequency shift Δf is detected in the space having the thickness in the Z direction within a scanning range in the XY directions. The resonance frequency shift Δf is recorded with respect to xyz coordinates. The three-dimensional distribution of the resonance frequency shifts Δf can be thereby measured.

Here, a triangle wave may be used as the distance modulation signal zm. When the triangle wave is used, however, a great impulsive force is generated in the Z direction, to possibly excite resonance of the scanner that scans the sample (or the probe). There may occur a problem that the observed image is distorted. Thus, it is better to use the sinusoidal wave.

Also, in the present embodiment, the XY position of the probe is horizontally scanned along the surface in a similar manner to the normal AFM observation. However, while the scanning signal x is the triangle wave in the normal AFM observation, the scanning signal x in the present embodiment is a "sawtooth wave" as shown in the drawing. In the three-dimensional measurement in the present embodiment, the resonance frequency shift is detected within a modulation range having a width in the Z direction. Thus, a scanning speed in the X direction is set to be substantially slower than a scanning speed in the Z direction. In this case, it is not necessary to detect the resonance frequency shift in a going and returning process in the X direction. In consideration of a possibility that an outward way and a return way do not correspond due to hysteresis of the scanner generated in the going and returning process, the resonance frequency shift is preferably detected when the probe is moved only in one direction. In this case, the time required for the return way can be shortened by using the sawtooth wave, so that an image acquisition speed can be improved. Therefore, it is more practical to use the sawtooth wave than the triangle wave.

Figure 9:
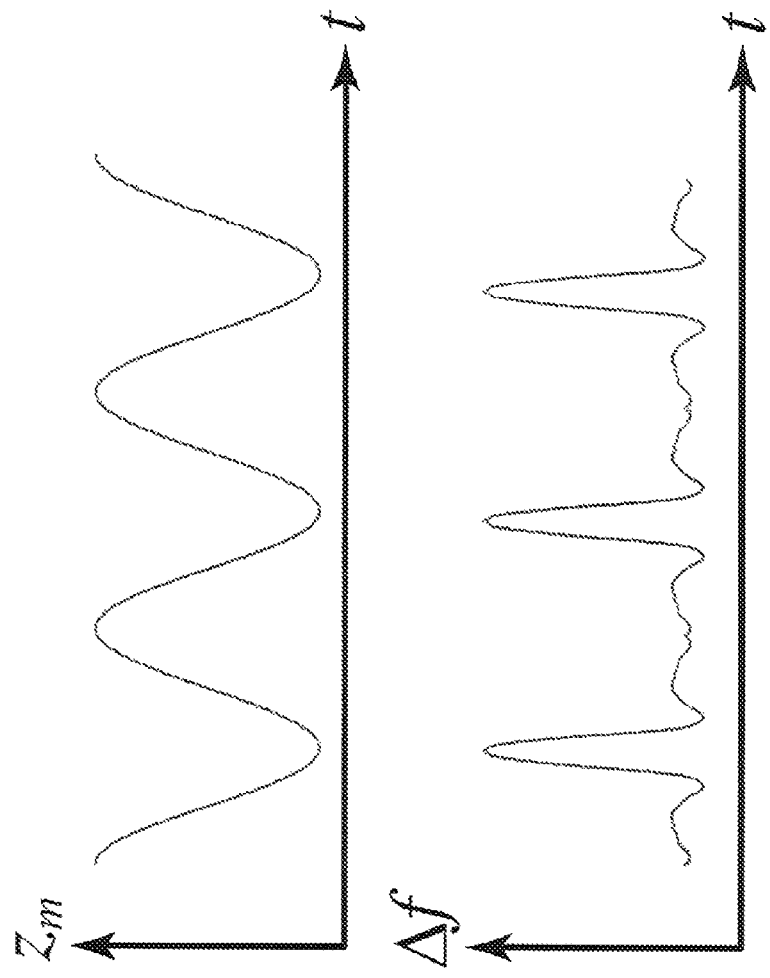
FIG. 9 is a view illustrating time variations in a distance modulation signal zm and a detection signal of a resonance frequency shift Δf in the three-dimensional measurement according to the present embodiment.

FIG. 9 shows an example of time variations in the distance modulation signal zm and the detection signal of the resonance frequency shift Δf in the three-dimensional measurement according to the present embodiment. As shown in the drawing, when the probe-sample distance is small, the resonance frequency Δf is varied a lot. Since the sinusoidal wave is used as the distance modulation signal zm in the present embodiment, the Z scanning speed at a position where the probe is closest to the sample is slowed down. Therefore, more information is obtained when the resonance frequency shift Δf is rapidly varied. The sinusoidal wave is preferably used in this point as well.

The distribution data of the three-dimensional measurement is obtained by processing the data in FIG. 9 with the XY-direction scanning data. The processing is performed by the three-dimensional distribution detecting section 31 of the computer 27 as described above. The resonance frequency shift Δf is recorded by setting a vertical axis to the distance modulation signal zm and a horizontal axis to the scanning signal x. Accordingly, an XZ image is obtained by one-line scanning in the X direction. Here, the variation in the Z-direction position due to the surface contours is included in the scanning signal z0, and not included in the XZ image. The XZ image thereby reflects a variation in the interaction force of the surface in the Z direction. The XZ image is thereby very conveniently used to make a picture of a minute change in force field near the sample surface. For example, it is assumed that there is a large concave or convex portion of 10 nm or more on the sample surface. In this case, it is difficult to express the concave or convex portion of picometer order in an image with good visibility based on the conventional technique. However, by using the three-dimensional measurement technique in the present invention, a minute force field distribution can be visualized even when there is a large concave or convex portion on the sample surface. The concave or convex portion of picometer order can be also expressed.

Preferably, one XZ image that records the amount of interaction when the probe is moved close to the sample, and one XZ image that records the amount of interaction when the probe is moved away from the sample are obtained by one-line scanning in the X direction. When the distance modulation frequency of the two XZ images is higher than the variation in the amount of interaction caused by the distance modulation, the two XZ images do not correspond to each other. Thus, the dynamic physicality of an interaction potential between the probe and the sample is obtained from a difference between the two XZ images. For example, in a case of a hydrated layer, the outward and return images are considered to be asymmetric depending on the viscosity or diffusion rate of water. Thus, the dynamic physicality can be obtained from the two XZ images. Meanwhile, when the distance modulation frequency is low enough, the above two XZ images correspond to each other. In the following, description is made by assuming that one XZ image is obtained in such a case.

As described above, the XZ image is obtained with respect to each scanning line in the X direction, and further recorded with respect to the scanning signal y. The resonance frequency shift can be thereby recorded in the three-dimensional space. The three-dimensional image of the resonance frequency shift can be obtained.

The value of the resonance frequency shift Δf is generated due to the interaction force, and may be converted to an actual quantitative value of the interaction force. Accordingly, the three-dimensional measurement of the force distribution adjacent to the sample surface can be performed.

In the above description using FIGS. 8 and 9, the scanning in the X direction is repeated while the Y position is shifted. It goes without saying that the scanning in the X direction and the scanning in the Y direction may be replaced with each other. The scanning signals x and y in FIG. 8 may be also replaced with each other.

"Drift Cancellation"

Next, a drift cancellation function preferably incorporated in the SPM of the present invention will be described. The drift cancellation function cancels a drift of the amount of interaction by using the three-dimensional measurement technique in the present invention. Here, the drift cancellation function is incorporated in the FM-AFM described above, to cancel a drift of the resonance frequency shift.

During in-liquid observation, particles existing in liquid adhere to the cantilever or a temperature fluctuates. Thus, the resonance frequency of the cantilever may drift, and the resonance frequency shift may also drift. In a state in which the conventional feedback to keep the resonance frequency shift constant is applied, the drift of the resonance frequency is unnoticeable. As a result, a great interaction force may be applied to the sample, or the probe-sample distance may not be kept constant, so that the data reliability may be lowered.

The drift cancellation function in the present invention can solve the above problem. By referring to FIG. 9, when the probe is located far from the sample, the interaction force is small, and the resonance frequency shift is also small. However, when the drift of the resonance frequency shift occurs, the resonance frequency shift is also detected even when the probe is away from the sample. By using the three-dimensional measurement data in the present invention, the resonance frequency shift obtained when the probe is away from the sample can be monitored during imaging. The drift of the resonance frequency shift can be canceled in real time, so that the data reliability can be improved.

Figure 10:
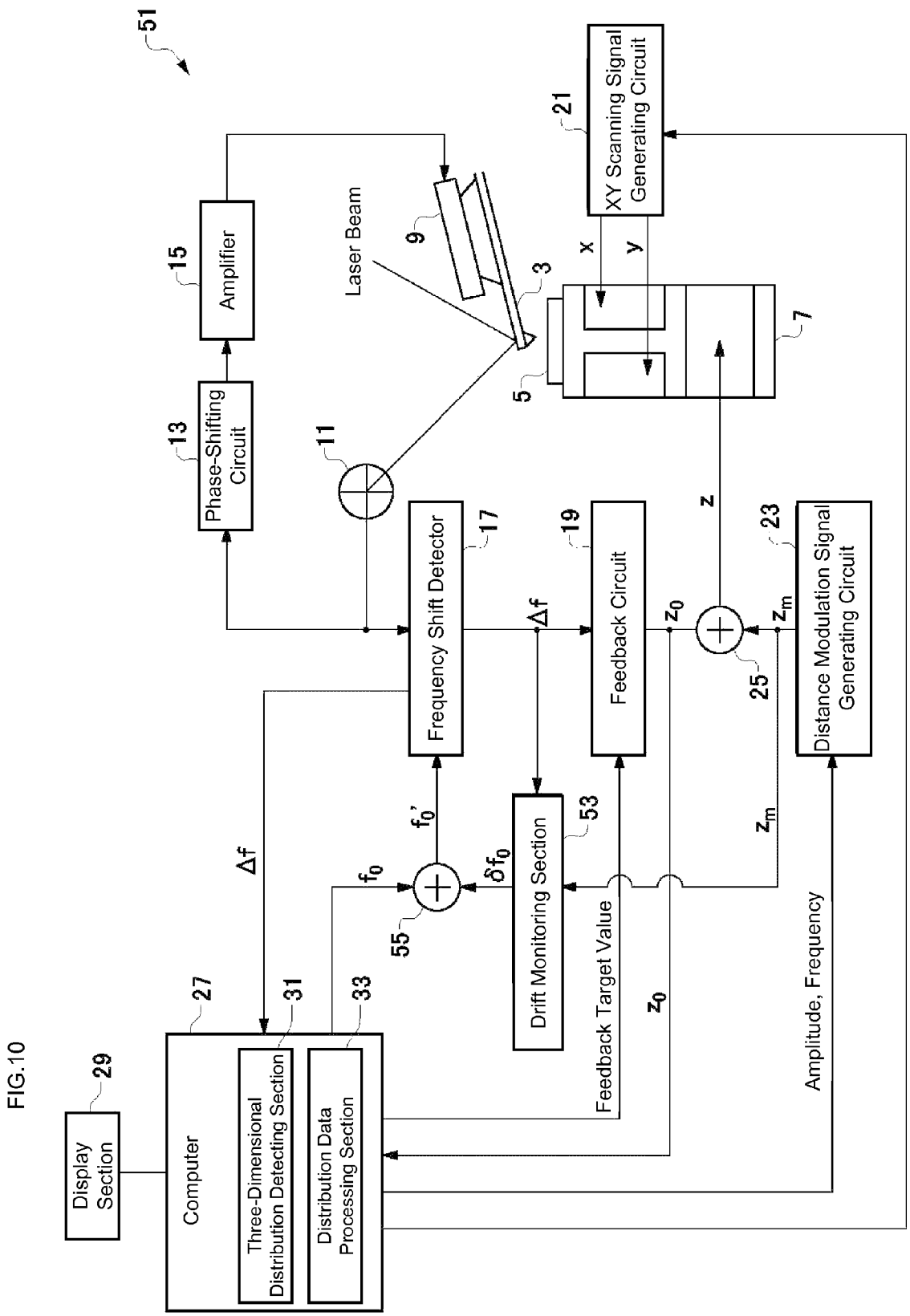
FIG. 10 is a view illustrating an AFM having a drift cancellation function by use of the three-dimensional measurement technique according to the present invention.

FIG. 10 shows an AFM having the aforementioned drift cancellation function. An AFM 51 in FIG. 10 has the same configuration as that of the AFM 1 in FIG. 7. The AFM 51 in FIG. 10 also includes a drift monitoring section 53 and an adding section 55. The drift monitoring section 53 monitors the drift of the resonance frequency shift, and the adding section 55 cancels the drift as described below.

The detection signal of the resonance frequency shift Δf is input into the drift monitoring section 53 from the frequency shift detector 17. The distance modulation signal zm is also input into the drift monitoring section 53 from the distance modulation signal generating circuit 23. The drift monitoring section 53 monitors the resonance frequency shift Δf detected at a predetermined drift monitoring position. The drift monitoring position is defined at a position within the variation range of the probe-sample distance by the distance modulation control and where the probe-sample distance increases. In the present embodiment, the drift monitoring position is preferably set to a position where zm becomes the largest on the sinusoidal wave in FIG. 9. The drift monitoring section 53 acquires the resonance frequency shift Δf when zm becomes the largest.

A sample-hold circuit may constitute the drift monitoring section 53. The drift monitoring section 53 generates a sample/hold trigger at a drift monitoring timing corresponding to the drift monitoring position based on the distance modulation signal zm input from the distance modulation control section 23. In the above example, the drift monitoring timing is a timing at which zm becomes the largest, and is at the top of the sinusoidal wave. The resonance frequency shift Δf is thereby acquired at the drift monitoring timing.

The resonance frequency shift Δf at the drift monitoring position (the drift monitoring timing) is output to the adding section 55 as a drift amount δf0 of the resonance frequency shift. The center frequency f0 is input into the adding section 55 from the computer 27. The adding section 55 adds the drift amount δf0 to the center frequency f0. An added center frequency f0' is fed to the frequency shift detector 17. The drift of the resonance frequency shift Δf is thereby canceled.

How the drift is canceled will be more specifically described. The center frequency f0 is the resonance frequency of the free oscillation of the cantilever 3. The frequency shift detector 17 performs subtraction by using the center frequency f0 as the reference value, to thereby detect the resonance frequency shift Δf. Therefore, when the cantilever 3 is in a free oscillating state, that is, when the cantilever 3 is far from the sample, the resonance frequency shift Δf becomes 0.

The cantilever 3 is away from the sample at the drift monitoring position. Thus, when no drift occurs, the resonance frequency shift Δ at the drift monitoring position is supposed to be almost 0. However, when the drift occurs, the resonance frequency shift Δf is detected at the drift monitoring position. Thus, the resonance frequency shift Δf at the drift monitoring position can be used as the drift amount δf0.

The drift amount δf0 is added to the center frequency f0 in the adding section 55 at a position frontward of the frequency shift detector 17. Thus, a value obtained by subtracting the drift amount δf0 from the resonance frequency shift is obtained as the detection result of the resonance frequency shift Δf. The drift cancellation is thereby achieved.

As described above, in the configuration in FIG. 10, the drift monitoring section 53 monitors the amount of interaction (the resonance frequency shift) detected at the predetermined drift monitoring position as an indication of the drift, and thereby functions as the drift monitoring section in the present invention. Also, the adding section 55 cancels the drift based on the amount of interaction (the resonance frequency shift) monitored at the drift monitoring position by the drift monitoring section 53, and thereby functions as the drift canceling section in the present invention. With the configuration described above, the drift can be canceled during measurement in real time, so that the data reliability can be improved.

The drift monitoring section and the drift canceling section are not limited to those in the above configuration, and may be appropriately modified within the scope of the present invention. For example, while the adding section 55 cancels the drift on the input side of the frequency shift detector 17 as the interaction detecting section, the drift cancellation may be also performed at another stage. For example, the drift cancellation may be performed after the amount of interaction is detected.

"Observation Example"

Next, an observation example by the AFM 1 of the present embodiment will be described. Here, a preferable example of processing the three-dimensional measurement data by the distribution data processing section 33 will be also described.

In the observation example, mica is used as the sample. The result of three-dimensional force distribution measurement at an interface between phosphate buffered saline and mica is shown.

Figure 11:
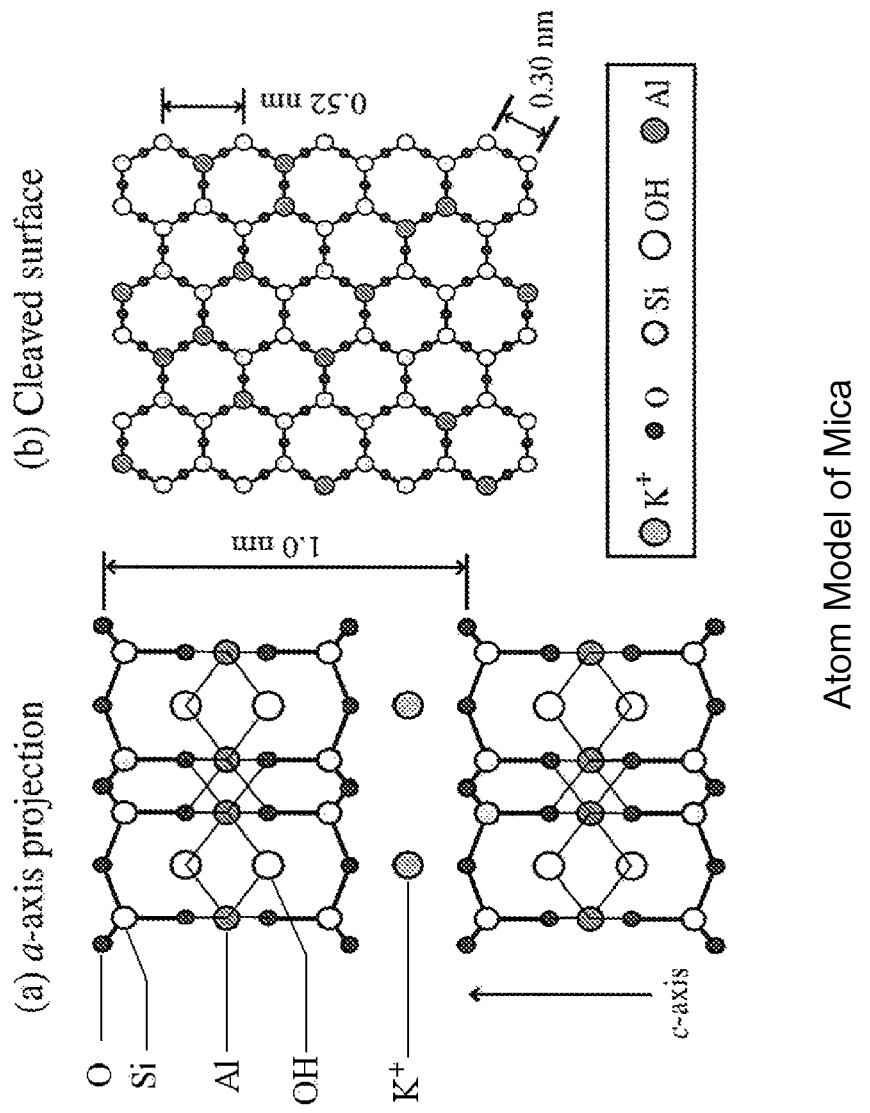
FIG. 11 is a view illustrating a crystal structure of mica in an observation example using the AFM of the present invention.

Mica has a crystal structure as shown in FIG. 11. Aluminum, silicon, oxygen and hydroxyl form a sheet. A plurality of sheets are layered via potassium ion by an electrostatic force. The layers are combined by the electrostatic force, and are thus easily cleaved. The cleaved surface of mica has a honeycomb mesh structure as shown in FIG. 11.

Drops of phosphate buffered saline were delivered onto the cleaved surface of mica. A three-dimensional frequency shift image was obtained at a solid-liquid interface. The observation conditions are as follows.

(1) Image size: 64×64×256 pixels in XYZ
(2) Scanning range: 4×4×1 nm (before drift correction)
(3) Scanning speed: 53 sec/3D xyz image,
    0.82 sec/2D xz image,
    5 ms/1D z profile Here, in the scanning range, 1 nm means the distance modulation amplitude. As described above, the scanning range is a range before the drift correction of the sample in the X direction during the XY scanning. The drift is corrected in the subsequent processing of the measurement result.

The frequency shift data obtained in the three-dimensional space can be displayed by being sliced at any plane. For example, in FIG. 12, the frequency shift data is sliced along an XY plane. The data in FIG. 12 indicates the dependence on the Z position of the probe.

Figure 12:
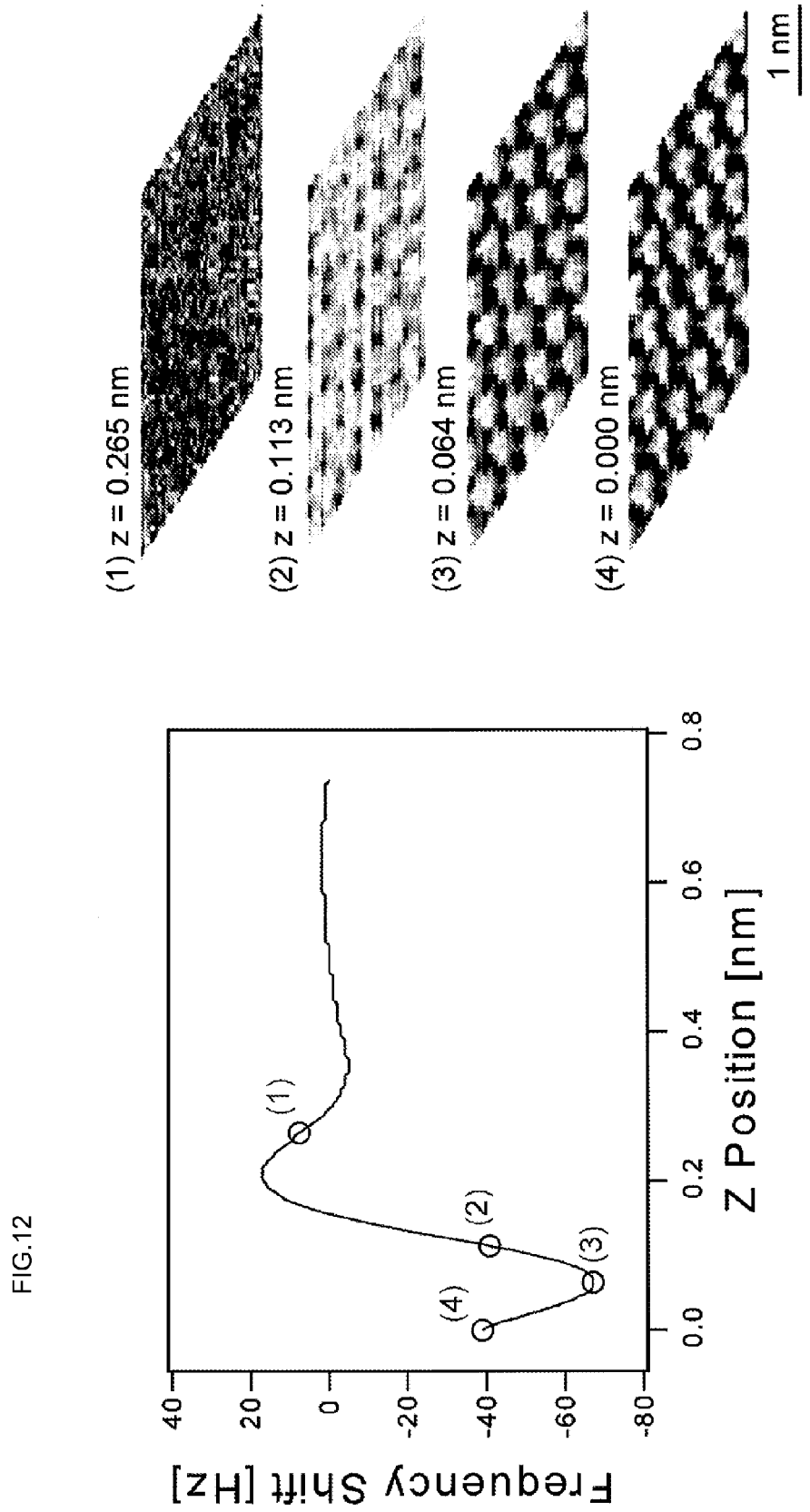
FIG. 12 is a view illustrating images and data obtained by slicing frequency shift data of a three-dimensional space along an XY plane.

It is found that resolution at atomic scale can be obtained in FIG. 12. Particularly, a pair of convex structures corresponding to two adjacent Si atoms are periodically observed in an XY image at a closest position Z=0.0 nm (Z=0.0 nm is the lowest point within the modulation range. The Z position in the measurement data is not an absolute position, but a position within the modulation range.).

Furthermore, FIG. 12 shows a frequency shift distance curve that plots the average value of the frequency shift amount at each XY plane with respect to the Z position of the probe. In the data, a repulsive force reaches its peak at around Z=0.2 nm. The peak corresponds to a repulsive force peak generated when the probe penetrates a hydrated layer formed in the solid-liquid interface. Such repulsive force peak can be clearly confirmed in the data in FIG. 12.

Figure 13:
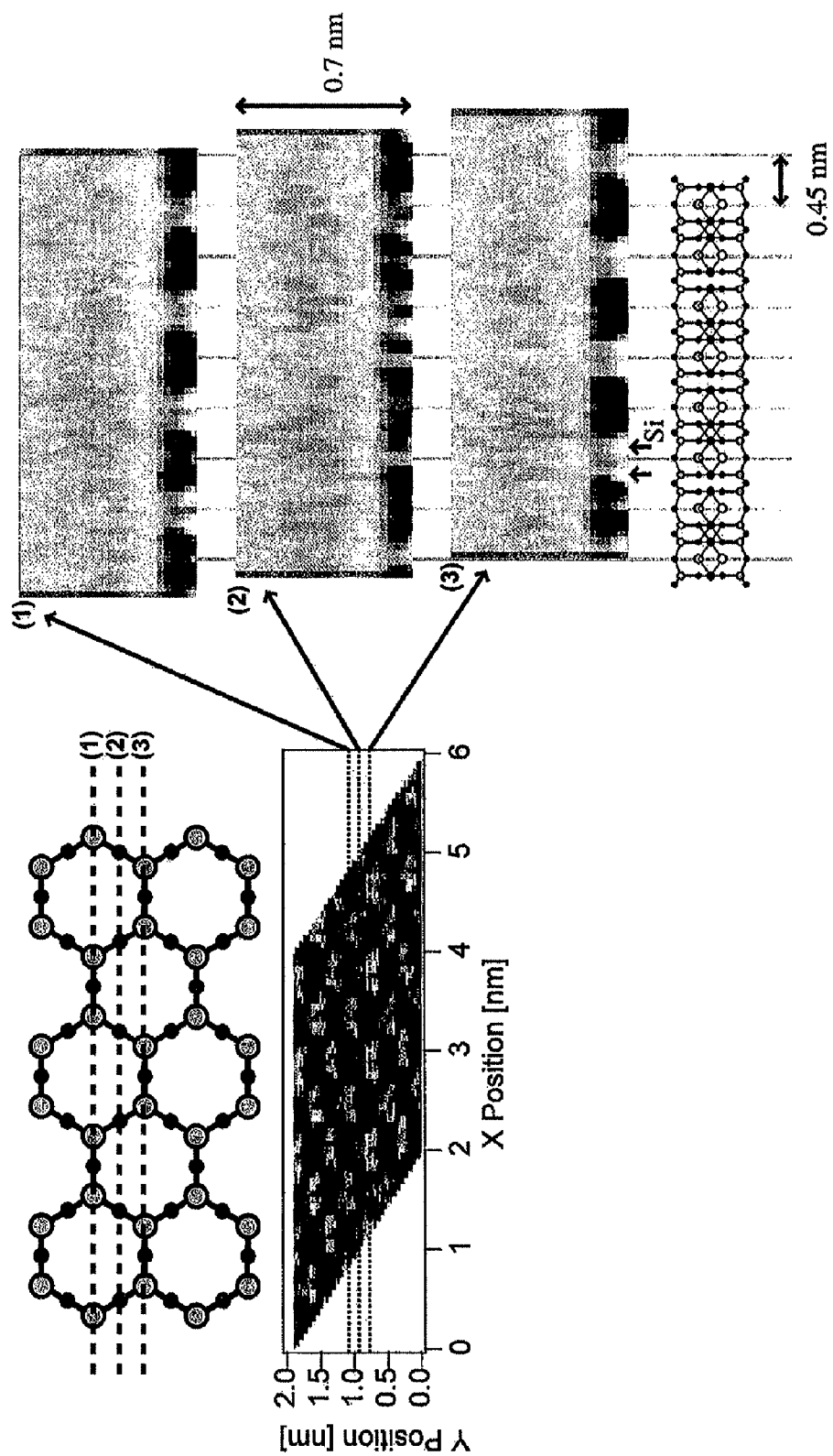
FIG. 13 is a view illustrating images obtained by slicing the frequency shift data of the three-dimensional space along an XZ plane.

Next, FIG. 13 shows images obtained by slicing the three-dimensional frequency shift data along an XZ plane of mica. The Y positions of the slice are indicated by numerals (1), (2) and (3) on a model view of the cleaved surface of mica. From the XZ images, it is also found that two peaks corresponding to adjacent Si atoms are clearly observed (a pair of arrows in the image (3)).

Bright contrast (a repulsive force) is also observed at an intermediate point between the peaks. The intermediate point corresponds to the center of a depressed portion of the honeycomb mesh structure. Such repulsive force is a structure which has not been observed in the conventional XY imaging, and is observable for the first time by using the technique in the present invention. In the conventional XY imaging, the probe is attracted to the XY position indicated by black contrast in the XZ image in the drawing and having a strong attractive force. It is thus difficult to control the Z-direction position of the probe with sufficient accuracy. Meanwhile, in the present invention, even if there is locally an unstable point, the probe position can be stably controlled at other XY positions to measure the frequency shift amount. As a result, the structure not observable in the normal imaging can be visualized.

Figure 14:
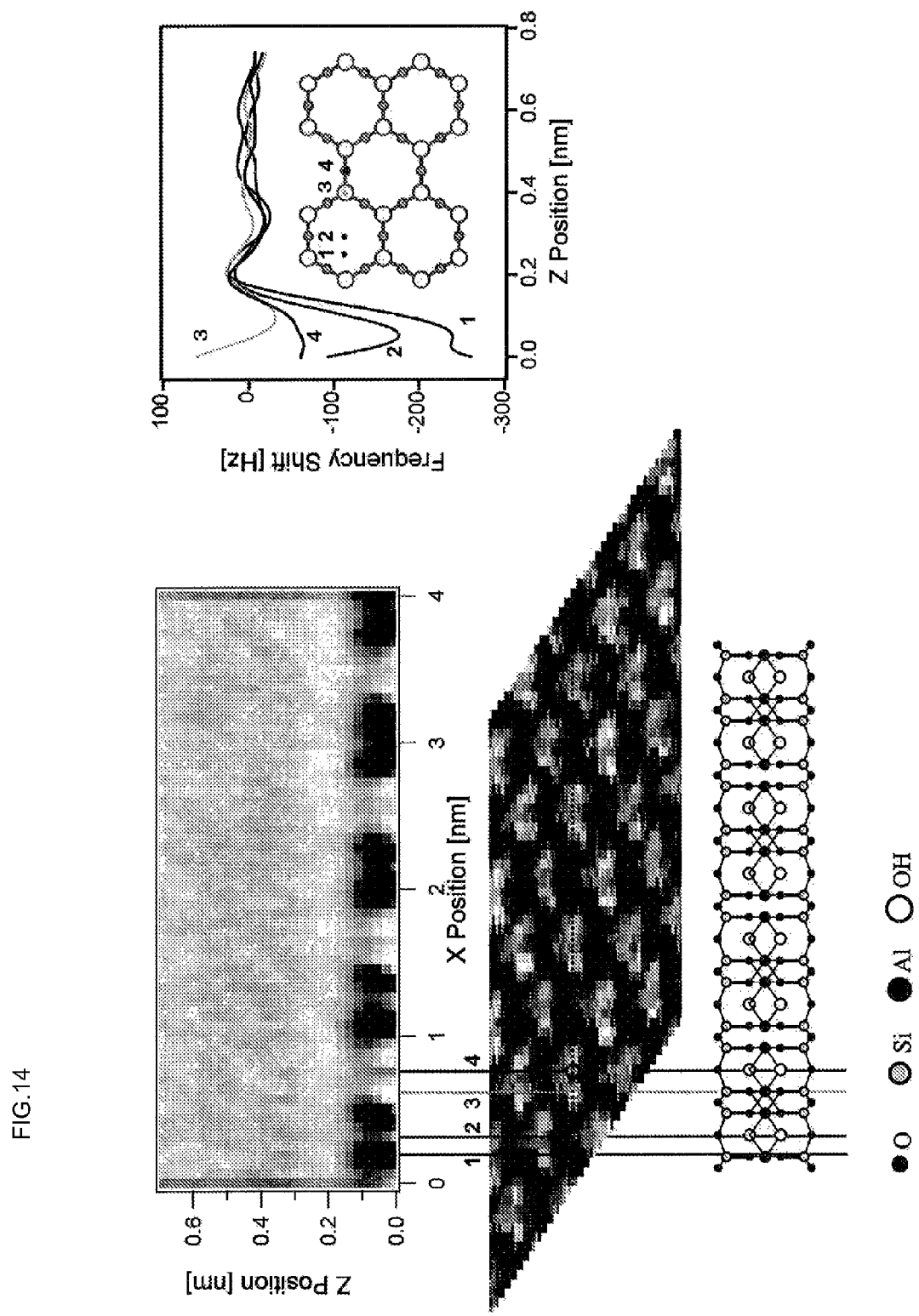
FIG. 14 is a view illustrating frequency shift variations in a Z direction at a plurality of different XY positions.

As shown in FIG. 14, a frequency shift distance curve representing a frequency shift variation in the Z direction at each XY position can be also extracted from the three-dimensional frequency shift data. The example in FIG. 14 shows frequency shift profiles in the Z direction (the frequency shift distance curves) at four XY positions. From the curves, it is found that the shapes of the frequency shift distance curves differ largely depending on the position at atomic scale on the mica surface. For example, in a profile measured immediately above an Si atom, a strong repulsive force is observed adjacent to the atom. On the other hand, in a profile measured above an oxygen atom between Si atoms, a weak repulsive force is observed adjacent to the atom. There has not been any example where such measurement is accurately performed under an in-liquid environment. Such measurement is enabled for the first time in the world by using the technique in the present invention.

Figure 2:
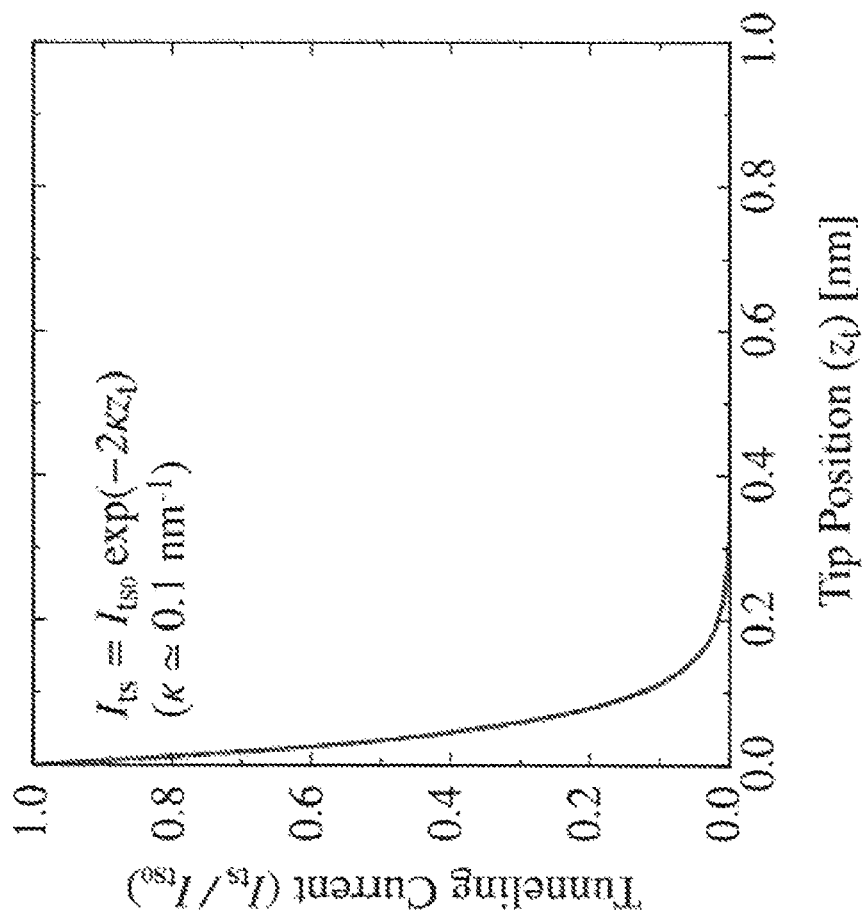
FIG. 2 is a view illustrating the relation between a probe position and a tunneling current in the STM.
Figure 3:
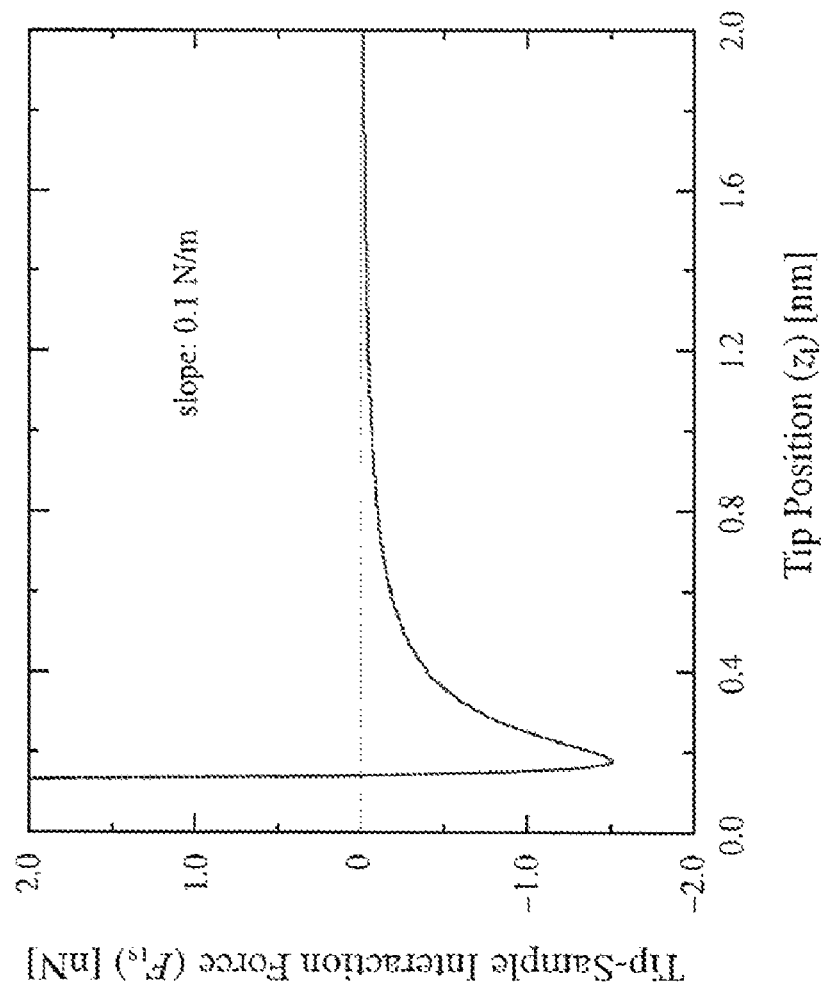
FIG. 3 is a view illustrating the relation between a probe position and an interaction force in atmosphere and in vacuum in an atomic force microscope (AFM).
Figure 4:
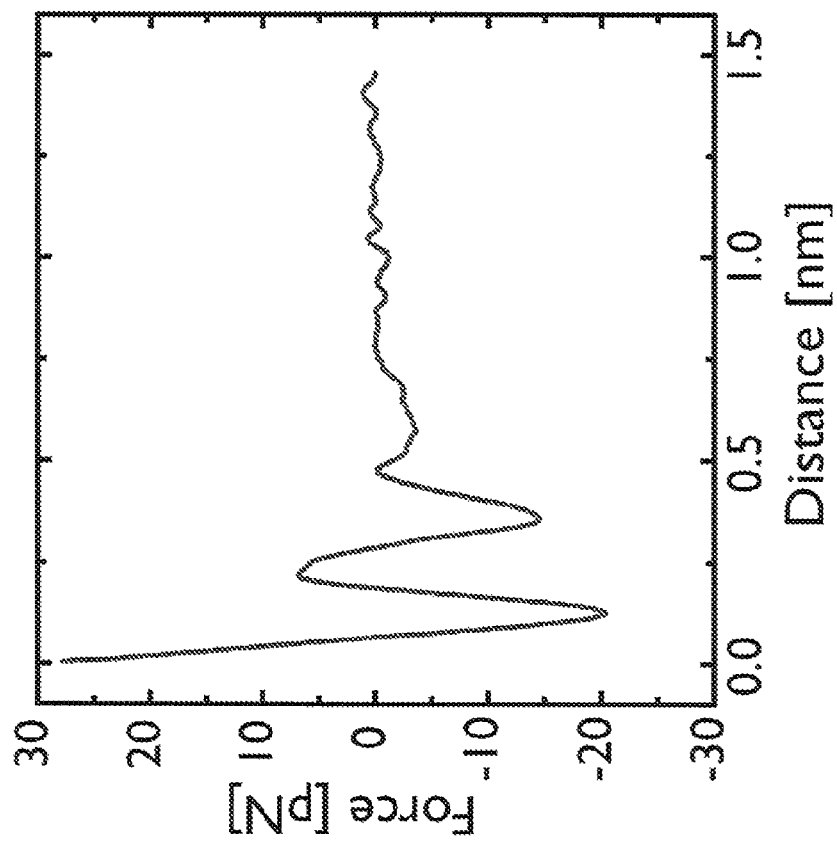
FIG. 4 is a view illustrating the relation between a probe position and an interaction force in liquid in the AFM, as a measurement result at an interface where a layered structure of a hydrated layer or the like is formed.

Next, modifications within the scope of the present invention will be described. In the aforementioned embodiment, the present invention is applied to the AFM. However, the present invention is not limited to the AFM as described above. The present invention may be applied to an SPM other than the AFM. For example, the present invention may be applied to an STM or an SNOM. As described using FIGS. 1 and 2, in the STM, the tunneling current monotonically varies with the probe-sample distance, and the control is relatively stable. However, there is a demand for improvement in the three-dimensional measurement thereof. With the present invention, a tunneling current distribution in a three-dimensional space can be also preferably measured while the stable control is being performed in the STM.

In the case in which the present invention is applied to the AFM, the present invention is not limited to the FM-AFM. The displacement amount of the cantilever, the amount of oscillation amplitude variation, the amount of phase variation, the amount of oscillation frequency variation or the like may be used as the amount of interaction between the probe and the sample depending on the type of the AFM. For example, the present invention may be applied to an AM-AFM. In this case, oscillation amplitude is detected from the detection signal of the displacement sensor. The present invention may be also applied a PM-AFM. In this case, a phase difference is detected from the detection signal of the displacement sensor.

Please note that the advantages of the present invention are very remarkably obtained in the FM-AFM. In the observation example in FIGS. 11 to 14, the data of particularly high resolution is obtained. Such high resolution is preferably achieved in the FM-AFM. That is, the present invention enables novel three-dimensional observation by utilizing the high resolution of the FM-AFM.

In a contact-mode AFM, a relatively soft cantilever is used. In this case, the probe is attracted to the sample when moved close to the sample. In the FM-AFM, however, the probe can be moved close to the sample. Thus, the FM-AFM is suitable for the measurement of a surface fine structure as described using FIGS. 11 to 14. The advantages of the present invention can be thereby remarkably obtained.

Next, a modification of the distance modulation control will be described. In the aforementioned embodiment, the distance modulation signal zm is added to the scanning signal z0 of the feedback control of the scanner. The scanning signal z0 is thereby modulated. In the configuration, the distance modulation control is performed on the sample (the scanner), and it is advantageous that the distance modulation control can be achieved with a simple configuration. However, the distance modulation control may be also performed on the probe within the scope of the present invention. The aforementioned embodiment employs the AFM, where the probe is provided at the cantilever. Thus, the distance modulation control may be performed on the cantilever, and the cantilever may be driven at the distance modulation frequency. To be more specific, the distance modulation signal may be added to the excitation signal of the cantilever. In this case, the distance modulation frequency is smaller than the resonance frequency of the cantilever. Thus, the signal with a smaller frequency is added to the excitation signal. In another example, another actuator may be provided to drive the cantilever at the distance modulation frequency. Since the distance modulation amplitude is very small, the another actuator may be small-sized as compared to the normal scanner. The three-dimensional measurement in the present invention may be also achieved by driving the probe at the distance modulation frequency as described above.

The SPM according to the present invention has been described above. Next, various advantages of the present invention will be summed up.

As described above, according to the present invention, the distance modulation control is performed while the feedback control is being performed. The distance modulation control varies the probe-sample distance at the distance modulation frequency higher than the response speed of the feedback control. With the present invention, the stable position control is ensured by the feedback control. Moreover, by performing the distance modulation control, the distribution of the interaction amounts in the three-dimensional space can be detected as described above. That is, in the present invention, the distribution of the interaction amounts in the three-dimensional space having the dimension within the scanning range and the thickness within the variation range of the probe-sample distance can be detected. Accordingly, the present invention can provide the technique for preferably measuring the distribution of the interactions between the probe and the sample in the three-dimensional space while performing the stable probe position control.

Also, in the present invention, the distance modulation control may vary the probe-sample distance in the sinusoidal pattern along the time axis as described above. By using the sinusoidal wave, it is possible to prevent a great impulsive force from being generated in the distance modulation control as described using FIG. 8. Also, by using the sinusoidal wave, the distance variation is slowed down when the probe-sample distance is small and the amount of interaction increases, so that more detection signals can be obtained as described using FIG. 9.

Also, in the aforementioned embodiment, the drive signal for driving the scanner is generated by the feedback control, and the distance modulation signal having the distance modulation frequency is generated by the distance modulation control. The distance modulation signal is added to the drive signal. In the configuration, the drive signal of the feedback control is modulated, so that the modulation of the probe-sample distance can be achieved with a simple configuration.

Also, in the present invention, the distribution of the interaction amounts when the probe is moved close to the sample by the distance modulation control, and the distribution of the interaction amounts when the probe is moved away from the sample by the distance modulation control may be separately acquired. In the above example, one XZ image that records the amount of interaction when the probe is moved close to the sample, and one XZ image that records the amount of interaction when the probe is moved away from the sample are acquired in the scanning in the X direction. When the distance modulation frequency of the two XZ images is higher than the variation in the amount of interaction caused by the distance modulation, the two XZ images do not correspond to each other. Thus, in the scanning probe microscope according to the present invention, the above two distributions (images) are compared, and the dynamic physicality of the interaction potential between the probe and the sample can be preferably obtained based on the difference therebetween.

Also, the present invention is preferably applied to the AFM as described above. The advantage of the present invention that the distribution of the interactions between the probe and the sample in the three-dimensional space can be preferably measured while the stable probe position control is being performed is remarkably obtained.

The present invention is particularly preferably applied to the FM-AFM. Accordingly, the useful observation result with the high resolution can be obtained as described using FIGS. 11 to 14, so that the advantages of the present invention are remarkably obtained.

Also, in the present invention, the SPM monitors the amount of interaction detected at the predetermined drift monitoring position defined within the variation range of the probe-sample distance by the distance modulation control and where the probe-sample distance increases, and cancels the drift of the amount of interaction based on the monitored amount of interaction. The configuration corresponds to the drift cancellation function of the AFM 51 in FIG. 10. By canceling the drift of the amount of interaction by using the three-dimensional measurement data in the present invention as described above, the data reliability can be further improved.

The SPM in the present invention further processes the data of the distribution of the interaction amounts in the three-dimensional space obtained by the three-dimensional measurement. The data processing is performed by the distribution data processing section of the computer in the above embodiment. Useful information for observation is provided by the data processing.

For example, the distribution data processing section may obtain the distribution of the interaction amounts on a plane where the probe-sample distance is constant as shown in FIG. 12. In FIG. 12, the distributions at a plurality of planes with different distances from each other are observed.

The distribution data processing section also obtains a plurality of representative values of the interaction amounts respectively on a plurality of planes where the probe-sample distances differ from each other, to thereby obtain a variation in the representative values when the probe is moved close to the sample as shown in FIG. 12. An interaction amount-distance curve (profile) is obtained by the configuration. The data corresponds to the frequency shift distance curve in FIG. 12. While the average value is employed as the representative value in FIG. 12, a value other than the average value may be also employed.

The distribution data processing section may also obtain the distribution of the interaction amounts on a cut plane obtained by cutting the three-dimensional space along a plane intersecting with the sample surface as shown in FIG. 13. In FIG. 13, the image of the plane perpendicular to the sample surface is observed.

The distribution data processing section may also obtain a variation in the interaction amounts along a line interacting with the sample surface at a plurality of different positions on the sample as shown in FIG. 14. In FIG. 14, an interaction amount-distance curve along the line perpendicular to the sample surface is obtained.

As described above, the useful observation information can be obtained by processing the three-dimensional measurement data in the present invention. The present invention can also achieve the observation impossible before as described using FIGS. 11 to 14.

Further advantages of the present invention will be described. The present invention performs the distance modulation control while performing the feedback control. The three-dimensional force-field measurement extremely adjacent to the sample surface is thereby enabled regardless of the contours of the sample surface. Even when there is a large concave or convex portion on the sample surface, damage to the probe or the sample can be prevented.

It has been conventionally difficult to observe or visualize the fine structure of a surface with a large concave or convex portion. In the present invention, however, the fine structure can be observed by the distance modulation while the probe is being moved along the contours of the sample by the feedback control. Accordingly, the fine structure of a surface with a large concave or convex portion can be observed and visualized (for example, see FIGS. 12 and 13 described above).

Also, in the conventional technique, the three-dimensional measurement based on the force curve measurement technique is performed as shown in FIG. 5. As compared to the conventional technique, the present invention has less waste time in the measurement, and a simpler recording system. Accordingly, the three-dimensional measurement can be easily sped up, and thereby performed at practical speed. For example, in the conventional technique, the measurement sometimes takes one day or more. Meanwhile, in the above observation example, the measurement is performed within one minute.

Also, in the three-dimensional imaging in the present invention, the Z position of the probe is modulated by the fixed signal with constant amplitude, and the response of the frequency shift thereto is recorded. The recording processing is independent of the feedback control that controls the average position of the probe. Thus, the recording processing does not include feedback noise. Therefore, a signal-to-noise ratio is higher than that in the normal XY imaging.

Also, in the present invention, since the distance modulation control is performed, the probe-sample distance always increases and decreases in the Z direction at each point on the sample (the probe position moves up and down). Even if there is an XY position to which the probe is locally attracted, no influence is caused to other measurement points from the attraction. Therefore, the structure which has not been observable in the conventional XY imaging can be imaged without being affected by the XY scanning of the probe (for example, see FIG. 13 described above).

The preferable embodiments according to the present invention have been described above. It goes without saying that the present invention is not limited to the aforementioned embodiments, and a person skilled in the art may modify the aforementioned embodiments within the scope of the present invention.

Although the presently-contemplated preferred embodiments of the present invention have been described above, it is apparent that various modifications may be made to the present embodiments. It is therefore intended that the appended claims encompass any such modifications within the spirit and scope of the present invention.

Industrial Applicability

As described above, the SPM according to the present invention can preferably measure the distribution of the interactions between the probe and the sample in the three-dimensional space while performing the stable probe position control. Thus, the present invention is very useful as a technique for observing a sample in liquid, for example.

REFERENCE SIGNS LIST 1, 51 AFM
3 Cantilever
5 Sample stage
7 Scanner
9 Lever actuator
11 Displacement sensor
13 Phase-shifting circuit
15 Amplifier
17 Frequency shift detector
19 Feedback circuit
21 XY scanning signal generating circuit
23 Distance modulation signal generating circuit
25 Signal adding section
27 Computer
29 Display section
31 Three-dimensional distribution detecting section
33 Distribution data processing section
53 Drift monitoring section
55 Adding section

The invention claimed is:

1. A scanning probe microscope comprising:
a probe;
a scanner which performs relative scanning between the probe and a sample;
a displacement sensor which detects a displacement of the probe;
an interaction detecting section which detects an amount of interaction generated by an interaction between the probe and the sample and representing magnitude of the interaction based on a signal detected by the displacement sensor;
a feedback control section which performs feedback control of a probe-sample distance as a distance between the probe and the sample such that the amount of interaction detected by the interaction detecting section is kept constant;
a distance modulation control section which performs distance modulation control to vary the probe-sample distance at a distance modulation frequency higher than a response speed of the feedback control; and
a three-dimensional distribution detecting section which detects a distribution of the interaction amounts in a three-dimensional space having a dimension within a scanning range and a thickness within a variation range of the probe-sample distance from the interaction amounts detected during the variation of the probe-sample distance by the distance modulation control while performing the relative scanning between the probe and the sample.

2. The scanning probe microscope according to claim 1, wherein the distance modulation control section varies the probe-sample distance in a sinusoidal pattern along a time axis.

3. The scanning probe microscope according to claim 1, wherein the feedback control section generates a drive signal for driving the scanner,
the distance modulation control section generates a distance modulation signal having the distance modulation frequency, and
the distance modulation signal is added to the drive signal.

4. The scanning probe microscope according to claim 1, wherein the three-dimensional distribution detecting section separately acquires the distribution of the interaction amounts during the probe approach to the sample by the distance modulation control, and the distribution of the interaction amounts during the probe retraction from the sample by the distance modulation control.

5. The scanning probe microscope according to claim 1, wherein the scanning probe microscope is an atomic force microscope, comprising a cantilever with the probe.

6. The scanning probe microscope according to claim 5, wherein the atomic force microscope is a frequency modulation atomic force microscope, and the interaction detecting section detects a resonance frequency shift of the cantilever as the amount of interaction.

7. The scanning probe microscope according to claim 1, further comprising:
a drift monitoring section which monitors the amount of interaction detected at a predetermined drift monitoring position, which is defined within the variation range of the probe-sample distance by the distance modulation control and at which the probe-sample distance takes a maximum value, as an indication of a drift of the amount of interaction; and
a drift canceling section which cancels the drift of the amount of interaction based on the amount of interaction monitored at the drift monitoring position by the drift monitoring section.

8. The scanning probe microscope according to claim 1, further comprising a distribution data processing section which processes data of the distribution of the interaction amounts in the three-dimensional space obtained by the three-dimensional distribution detecting section,
wherein the distribution data processing section obtains the distribution of the interaction amounts on a plane where the probe-sample distance is constant.

9. The scanning probe microscope according to claim 1, further comprising a distribution data processing section which processes data of the distribution of the interaction amounts in the three-dimensional space obtained by the three-dimensional distribution detecting section,
wherein the distribution data processing section obtains a plurality of representative values of the interaction amounts respectively on a plurality of planes where the probe-sample distances differ from each other, to thereby obtain a variation in the representative values during the probe approach to the sample.

10. The scanning probe microscope according to claim 1, further comprising a distribution data processing section which processes data of the distribution of the interaction amounts in the three-dimensional space obtained by the three-dimensional distribution detecting section,
wherein the distribution data processing section obtains the distribution of the interaction amounts on a cut plane obtained by cutting the three-dimensional space along a plane intersecting with a surface of the sample.

11. The scanning probe microscope according to claim 1, further comprising a distribution data processing section which processes data of the distribution of the interaction amounts in the three-dimensional space obtained by the three-dimensional distribution detecting section,
    wherein the distribution data processing section obtains a variation in the interaction amounts along a line intersecting with a surface of the sample at a plurality of different positions on the sample.

12. An observation method for a scanning probe microscope, comprising:
    performing relative scanning between a probe and a sample by moving the probe and the sample close to each other;
    detecting a displacement of the probe;
    detecting an amount of interaction generated by an interaction between the probe and the sample and representing magnitude of the interaction based on a detected signal;
    performing feedback control of a probe-sample distance as a distance between the probe and the sample such that the amount of interaction is kept constant;
    performing distance modulation control to vary the probe-sample distance at a distance modulation frequency higher than a response speed of the feedback control; and
    detecting a distribution of the interaction amounts in a three-dimensional space having a dimension within a scanning range and a thickness within a variation range of the probe-sample distance from the interaction amounts detected during the variation of the probe-sample distance by the distance modulation control while performing the relative scanning between the probe and the sample.

13. An observation program for a scanning probe microscope, causing a computer to execute:
    a process of performing relative scanning between a probe and a sample by moving the probe and the sample close to each other;
    a process of detecting a displacement of the probe;
    a process of detecting an amount of interaction generated by an interaction between the probe and the sample and representing magnitude of the interaction based on a detected signal;
    a process of performing feedback control of a probe-sample distance as a distance between the probe and the sample such that the amount of interaction is kept constant;
    a process of performing distance modulation control to vary the probe-sample distance at a distance modulation frequency higher than a response speed of the feedback control; and
    a process of detecting a distribution of the interaction amounts in a three-dimensional space having a dimension within a scanning range and a thickness within a variation range of the probe-sample distance from the interaction amounts detected during the variation of the probe-sample distance by the distance modulation control while performing the relative scanning between the probe and the sample.

* * * * *